US012525692B2

(12) United States Patent
Lim et al.

(10) Patent No.: US 12,525,692 B2
(45) Date of Patent: Jan. 13, 2026

(54) BLIND BATTERY CONNECTOR

(71) Applicant: Google LLC, Mountain View, CA (US)

(72) Inventors: James Robert Lim, Mountain View, CA (US); Pinci Liao, Taichung (TW); Chih-Min Chien, Taipei (TW); Chien-Yueh Tung, Zhubei (TW)

(73) Assignee: Google LLC, Mountain View, CA (US)

( * ) Notice: Subject to any disclaimer, the term of this patent is extended or adjusted under 35 U.S.C. 154(b) by 374 days.

(21) Appl. No.: 18/173,607

(22) Filed: Feb. 23, 2023

(65) Prior Publication Data

US 2023/0344099 A1    Oct. 26, 2023

Related U.S. Application Data

(63) Continuation of application No. PCT/US2022/071880, filed on Apr. 22, 2022.

(51) Int. Cl.
*H01M 50/597* (2021.01)
*H01M 10/42* (2006.01)
*H01R 13/62* (2006.01)
*H01R 13/64* (2006.01)

(52) U.S. Cl.
CPC ....... *H01M 50/597* (2021.01); *H01M 10/425* (2013.01); *H01R 13/6205* (2013.01); *H01R 13/64* (2013.01)

(58) Field of Classification Search
CPC .............. H01M 50/597; H01M 10/425; H01R 13/6205; H01R 13/64
USPC ......................................................... 439/39
See application file for complete search history.

(56) References Cited

U.S. PATENT DOCUMENTS

| | | |
|---|---|---|
| 2007/0072442 A1 | 3/2007 | Difonzo et al. |
| 2013/0273752 A1 | 10/2013 | Rudisill et al. |
| 2015/0091388 A1 | 4/2015 | Golko et al. |
| 2017/0212570 A1 | 7/2017 | Norton et al. |
| 2017/0317444 A1 | 11/2017 | Narayanasamy et al. |

(Continued)

OTHER PUBLICATIONS

"International Preliminary Report on Patentability", Application No. PCT/US2022/071880, Oct. 8, 2024, 7 pages.

(Continued)

*Primary Examiner* — Tulsidas C Patel
*Assistant Examiner* — Jeffrey Mountain
(74) *Attorney, Agent, or Firm* — Colby Nipper PLLC

(57) ABSTRACT

The present document describes techniques associated with a blind battery connector. The blind battery connector described herein enables a user to blindly engage, safely and securely, a battery connector with a system-side connector. In aspects, the blind battery connector includes polarity-oriented magnets at both the battery connector and the system-side connector to automatically align and engage the battery connector with the system-side connector with correct orientation. The magnets may be embedded or removably assembled to the battery connector and the system-side connector. The blind battery connector controls initial alignment of the battery connector for coupling with the system-side connector and provides additional mechanical strength to the coupling against drop, vibration, and shock. The techniques described herein may decrease battery connection time at factory assembly, increase units per hour, and lower operating costs, while decreasing the likelihood of battery connector damage and/or reverse polarity engagement.

20 Claims, 18 Drawing Sheets

(56) References Cited

U.S. PATENT DOCUMENTS

2018/0104829 A1    4/2018   Altman et al.
2018/0314296 A1    11/2018  Evans et al.
2020/0097042 A1*   3/2020   Emgin ................ G06F 1/1626

OTHER PUBLICATIONS

"GCSE Physics—Permanent & Induced Magnets #77", Retrieved at: https://www.youtube.com/watch?v=bOZ2Hk2hKLE, Jun. 10, 2019, 1 page.
"International Search Report and Written Opinion", Application No. PCT/US2022/071880, Dec. 5, 2022, 10 pages.

\* cited by examiner

400 ↘

402 ↘

BLIND BATTERY CONNECTOR

RELATED APPLICATION(S)

This application is a continuation of International Application No. PCT/US2022/071880, filed Apr. 22, 2022, the disclosure of which is incorporated herein by reference in its entirety.

BACKGROUND

At the device-level battery integration into a system, including customer replacement batteries, some battery packs have battery connectors that mate blindly into the system. A blind battery connection is where a user (e.g., operator, consumer attempts to engage and/or plug in a battery connector into the system and is unable to "see" the connection, resulting in some guessing and using touch sensory by the user to engage the battery connector. Some batteries, including lithium-ion (Li-ion) batteries, are complex and pose a safety risk, if not handled properly. Blind battery connections for Li-ion batteries introduce additional safety issues for users. Moreover, right-to-repair and government regulations in regard to the ability for users to replace embedded Li-ion batteries, from both a consumer-rights perspective and a sustainability perspective, raise many challenges and opportunities.

SUMMARY

The present document describes techniques associated with a blind battery connector. The blind battery connector described herein enables a user to blindly engage, safely and securely, a battery connector with a system-side connector. In aspects, the blind battery connector includes polarity-oriented magnets at both the battery connector and the system-side connector to automatically align and engage the battery connector with the system-side connector with correct orientation. The magnets may be embedded or removably assembled to the battery connector and the system-side connector. The blind battery connector controls initial alignment of the battery connector for coupling with the system-side connector and provides additional mechanical strength to the coupling against drop, vibration, and shock. The techniques described herein may decrease battery connection time at factory assembly, increase units per hour (UPH), and lower operating costs, while decreasing the likelihood of battery connector damage and/or reverse polarity engagement.

In aspects, an electronic device for engaging a blind battery connection for placing or replacing a battery is disclosed. The electronic device may include an enclosure including a receptacle for receiving a battery pack, a circuit board positioned within the enclosure, and a system-side connector disposed within the enclosure and attached to the circuit board. The system-side connector is configured to be electrically coupled to a battery connector of the battery pack. In addition, the system-side connector includes a first polarity-oriented magnet connector corresponding to a second polarity-oriented magnet connector of the battery connector. The system-side connector is also configured to use polarity to define an orientation and alignment of the system-side connector relative to the battery connector when in proximity to the battery connector based on a magnetic attraction force. Further, in an incorrect orientation, the first polarity-oriented magnet connector and the second polarity-oriented magnet connector repel each other via a magnetic repulsion force.

In aspects, the electronic device also includes the battery connector disclosed above, which is configured to electrically couple with the system-side connector.

This summary is provided to introduce simplified concepts of a blind battery connector, which are further described below in the Detailed Description. This summary is not intended to identify essential features of the claimed subject matter, nor is it intended for use in determining the scope of the claimed subject matter.

BRIEF DESCRIPTION OF DRAWINGS

The details of one or more aspects of a blind battery connector are described in this document with reference to the following drawings. The same numbers are used throughout the drawings to reference like features and components.

DETAILED DESCRIPTION

Overview

The present document describes techniques and apparatuses associated with a blind battery connector. These techniques implement a hardware solution that utilizes removable and/or embedded polarity-oriented magnets to control alignment, orientation, and engagement of a battery connector to a system-side connector of an electronic device. In aspects, the polarity-oriented magnets are embedded or removably assembled around a contact surface of the battery connector and around a mating surface of the system-side connector such that the magnets define a single orientation for mating the battery connector to the system-side connector. This may be particularly useful for a blind connection where such engagement is not visible to a user attempting to manually align the battery connector to the system-side connector.

The techniques described herein enable a user to confidently engage a blind battery connection. For example, these techniques include using polarity-oriented magnets at the battery connector and system-side connector to control alignment and engage the battery connector to the system-side connector with correct orientation.

Using the techniques described herein, initial alignment of the battery connector relative to the system-side connector is automatically controlled. Additionally, mechanical strength is enhanced against drop, vibration, shock, and so forth. At factory assembly, battery connection time may be reduced, increasing units per hour (UPH) and lower operating costs, while preventing battery connector damage and reverse polarity engagement. For example, operators can blindly connect a battery to a system, reproducibly and reliably, without an automation machine. Furthermore, the techniques described herein enable owners of consumer electronics to repair and/or replace components within their devices. Also, the described techniques fulfill sustainability options under government regulations, which may require access to devices for user-performed repair or replacement, from a longevity and sustainability perspective, to ensure that devices last longer before being sent to the landfill.

While features and concepts of the described techniques for a blind battery connector can be implemented in any number of different environments, aspects are described in the context of the following examples.

Example Systems and Apparatuses

Figure 1:
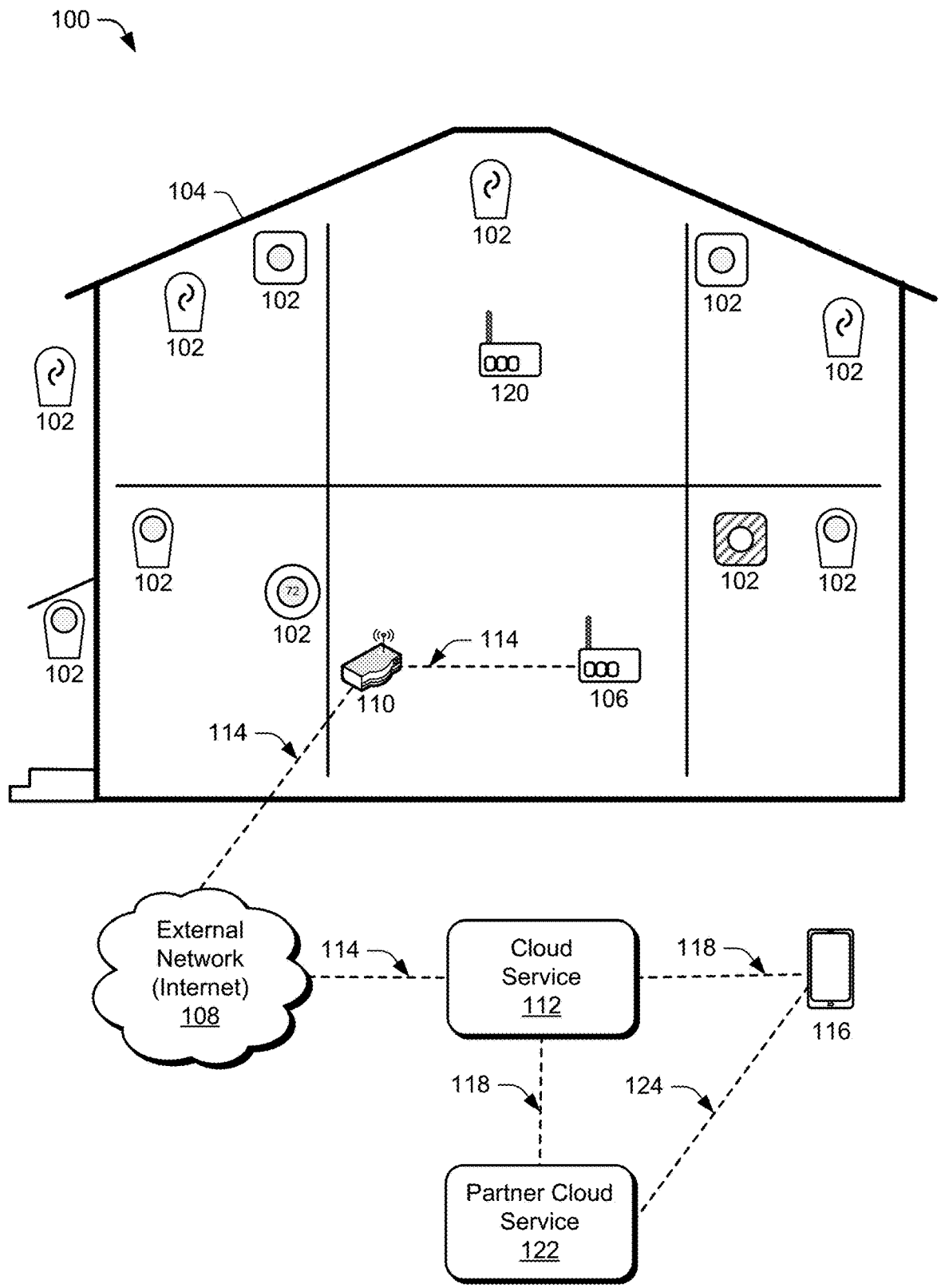
FIG. 1 illustrates an example network environment in which aspects of a blind battery connector can be implemented.

FIG. 1 illustrates an example network environment 100 in which aspects of a blind battery connector can be implemented. The network environment 100 includes a home area network (HAN). The HAN includes wireless network devices 102 (e.g., electronic devices) that are disposed about a structure 104, such as a house, and are connected by one or more wireless and/or wired network technologies, as described below. The HAN includes a border router 106 that connects the HAN to an external network 108, such as the Internet, through a home router or access point 110.

To provide user access to functions implemented using the wireless network devices 102 in the HAN, a cloud service 112 connects to the HAN via a border router 106, via a secure tunnel 114 through the external network 108 and the access point 110. The cloud service 112 facilitates communication between the HAN and internet clients 116, such as apps on mobile devices, using a web-based application programming interface (API) 118. The cloud service 112 also manages a home graph that describes connections and relationships between the wireless network devices 102, elements of the structure 104, and users. The cloud service 112 hosts controllers which orchestrate and arbitrate home automation experiences, as described in greater detail below.

The HAN may include one or more wireless network devices 102 that function as a hub 120. The hub 120 may be a general-purpose home automation hub, or an application-specific hub, such as a security hub, an energy management hub, a heating, ventilation, and air conditioning (HVAC) hub, and so forth. The functionality of a hub 120 may also be integrated into any wireless network device 102, such as a smart thermostat device or the border router 106. In addition to hosting controllers on the cloud service 112, controllers can be hosted on any hub 120 in the structure 104, such as the border router 106. A controller hosted on the cloud service 112 can be moved dynamically to the hub 120 in the structure 104, such as moving an HVAC zone controller to a newly installed smart thermostat.

Hosting functionality on the hub 120 in the structure 104 can improve reliability when the user's internet connection is unreliable, can reduce latency of operations that would normally have to connect to the cloud service 112, and can satisfy system and regulatory constraints around local access between wireless network devices 102.

The wireless network devices 102 in the HAN may be from a single manufacturer that provides the cloud service 112 as well, or the HAN may include wireless network devices 102 from partners. These partners may also provide partner cloud services 122 that provide services related to their wireless network devices 102 through a partner Web API 124. The partner cloud service 122 may optionally or additionally provide services to internet clients 116 via the web-based API 118, the cloud service 112, and the secure tunnel 114.

The network environment 100 can be implemented on a variety of hosts, such as battery-powered microcontroller-based devices, line-powered devices, and servers that host cloud services. Protocols operating in the wireless network devices 102 and the cloud service 112 provide a number of services that support operations of home automation experiences in the distributed computing environment 100. These services include, but are not limited to, real-time distributed data management and subscriptions, command-and-response control, real-time event notification, historical data logging and preservation, cryptographically controlled security groups, time synchronization, network and service pairing, and software updates.

Figure 2:
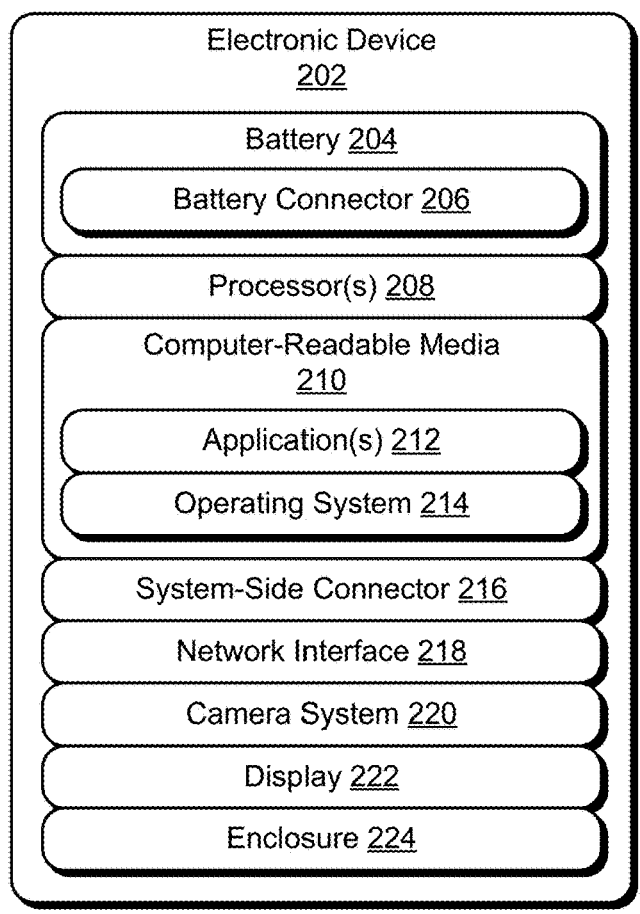
FIG. 2 illustrates an example implementation of the electronic device from FIG. 1 in more detail.
Figure 2:
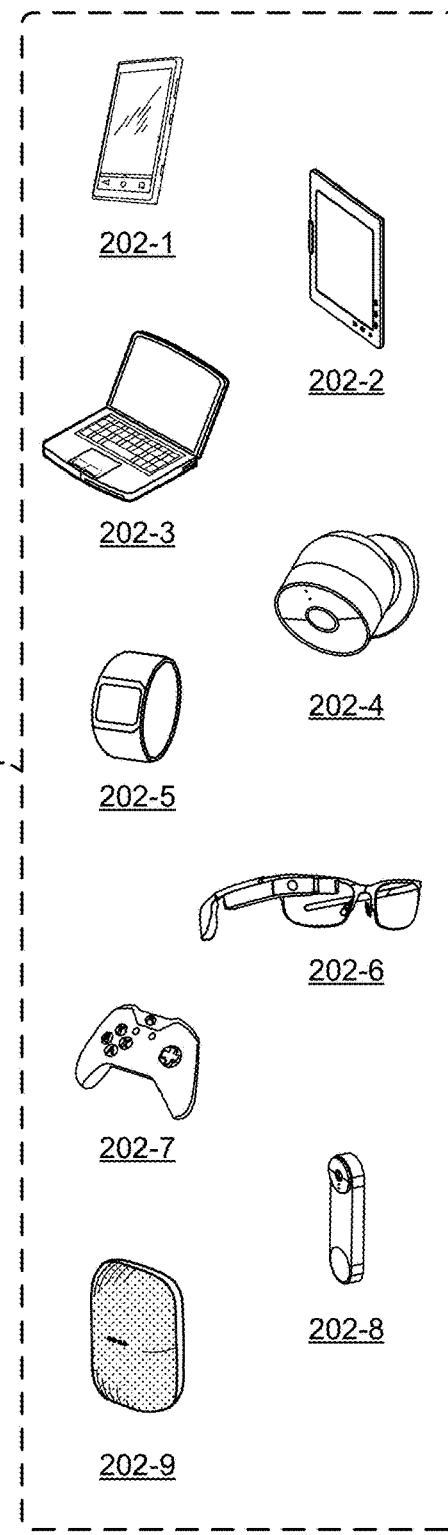

FIG. 2 illustrates an example implementation of an electronic device from FIG. 1 in more detail. The electronic device 202 (e.g., the wireless network device 102, mobile device) of FIG. 2 is illustrated with a variety of example devices, including a smartphone 202-1, a tablet 202-2, a laptop 202-3, a security camera 202-4, a computing watch 202-5, computing spectacles 202-6, a gaming system 202-7, a video-recording doorbell 202-8, and a speaker 202-9. The electronic device 202 can also include other devices, e.g., televisions, entertainment systems, desktop computers, audio systems, projectors, automobiles, drones, track pads, drawing pads, netbooks, e-readers, home security systems, camera systems, thermostats, and other home appliances. Note that the electronic device 202 can be mobile, wearable, non-wearable but mobile, or relatively immobile (e.g., desktops and appliances).

The electronic device 202 includes a battery pack (e.g., battery 204). The battery 204 may be any suitable rechargeable battery. As described herein, the battery 204 may be a Li-ion battery. Various different Li-ion-battery chemistries may be implemented, some examples of which include lithium cobalt oxide (LiCoO2), lithium iron phosphate (LiFePO4), lithium manganese oxide (LiMn2O4 spinel, or Li2MnO3-based lithium-rich layered materials, LMR-NMC), and lithium nickel manganese cobalt oxide (LiNiMnCoO2, Li-NMC, LNMC, NMC, or NCM and the various ranges of Co stoichiometry). Also, Li-ion batteries may include various different anode materials, including graphite-based anodes, silicon (Si), graphene, and other cation intercalation/insertion/alloying anode materials. The battery 204 includes a battery connector 206 for physically and electrically coupling to the electronic device 202 to enable power to transfer from the battery 204 to the electronic device 202.

The electronic device 202 includes one or more processors 208 (e.g., any of microprocessors, microcontrollers, or other controllers) that can process various computer-executable instructions to control the operation of the electronic device 202 and to enable techniques for a blind battery connector. The processors 208 are described in further detail below.

The electronic device 202 also includes computer-readable media 210 (CRM 210) that provides storage for various applications 212 and system data. Applications 212 and/or an operating system 214 implemented as computer-readable instructions on the computer-readable media 210 (e.g., the storage media) can be executed by the processor(s) 208 to provide some or all of the functionalities described herein. The computer-readable media 210 provides data storage mechanisms to store various device applications 212, an operating system 214, memory/storage, and other types of information and/or data related to operational aspects of the electronic device 202. For example, the operating system 214 can be maintained as a computer application within the computer-readable media 210 and executed by the processor(s) 208 to provide some or all of the functionalities described herein. The device applications 212 may include a device manager, such as any form of a control application, software application, or signal-processing and control modules. The electronic device 202 may also include, or have access to, one or more machine learning systems.

Various implementations of the application(s) 212 can include, or communicate with, a System-on-Chip (SoC), one or more Integrated Circuits (ICs), a processor with embedded processor instructions or configured to access processor instructions stored in memory, hardware with embedded firmware, a printed circuit board (PCB) with various hardware components, or any combination thereof. The PCB may be formed, for example, from glass-reinforced epoxy material such as FR4. In some instances, the PCB may include a single layer of electrically-conductive traces and be a single-layer board. In other instances, the PCB may be a multi-layer board that includes multiple layers of electrically-conductive traces that are separated by layers of a dielectric material.

The electronic device 202 may also include a system-side connector 216, which couples to the battery connector 206 to provide a physical and electric connection between the battery connector 206 and the electronic device 202. The electronic device 202 receives electric current from the battery 204 through the system-side connector 216 and the battery connector 206.

The electronic device 202 may also include a network interface 218. The electronic device 202 can use the network interface 218 for communicating data over wired, wireless, optical, or audio (e.g., acoustic) networks. By way of example and not limitation, the network interface 218 may communicate data over a local-area-network (LAN), a wireless local-area-network (WLAN), a home area network (HAN), a personal-area-network (PAN), a wide-area-network (WAN), an intranet, the Internet, a peer-to-peer network, point-to-point network, or a mesh network. The network interface 218 can be implemented as one or more of a serial and/or parallel interface, a wireless interface, any type of network interface, a modem, or any other type of communication interface. Using the network interface 218, the electronic device 202 may communicate via a cloud computing service (e.g., the cloud service 112) to access a platform having resources.

The electronic device 202 also includes a camera system 220. The camera system 220 is configured to capture images, video, and/or audio. Any suitable camera system 220 may be implemented in or communicatively coupled to the electronic device 202. The camera system 220 may be a digital camera that converts light captured by a lens to digital data representing a scene within the field of view of the lens.

The electronic device 202 can also include a display 222 (e.g., display device 222). The display 222 can include any suitable touch-sensitive display device, e.g., a touchscreen, a liquid crystal display (LCD), thin-film transistor (TFT) LCD, an in-place switching (IPS) LCD, a capacitive touchscreen display, an organic light-emitting diode (OLED) display, an active-matrix organic light-emitting diode (AMOLED) display, super AMOLED display, and so forth. The display 222 may be referred to as a display or a screen, such that digital content may be displayed on-screen.

The electronic device 202 also includes an enclosure 224 (e.g., housing). The enclosure 224 houses the various components of the electronic device 202, including, for example, the battery 204 and the camera system 220. In aspects, the enclosure 224 includes at least two portions that are coupled together. The at least two portions of the enclosure 224 can be tightly fitted together with seals to prevent dust and water ingress into the circuitry and other components housed within the enclosure 224.

Many components described herein are arranged within the enclosure 224, including the system-side connector 216, one or more printed circuit boards, the battery 204, and so forth. The enclosure 224 includes a space or receptacle for receiving the battery 204, which is electrically couplable to the system-side connector 216. The system-side connector 216 is attached to a circuit board, including a printed circuit board (PCB) (e.g., main logic board) of the electronic device 202, where the PCB is also arranged within the enclosure 224. Accordingly, the battery 204 (including the battery connector 206) and the system-side connector 216 are internal to the electronic device 202. In aspects, the system-side connector 216 and the battery 204 do not include ports facing outward (externally) from the electronic device 202.

These and other capabilities and configurations, as well as ways in which entities of FIGS. 1 and 2 act and interact, are set forth in greater detail below. These entities may be further divided, combined, and so on. The network environment 100 of FIG. 1 and the detailed illustrations of FIG. 2 through FIG. 17 illustrate some of many possible environments, devices, and methods capable of employing the described techniques, whether individually or in combination with one another. FIGS. 3 to 14 illustrate various implementations of a blind battery connector and are not necessarily limited to the combinations shown for implementing the blind battery connector. These implementations may be further divided, combined, reorganized, or linked to provide a wide array of additional and/or alternate implementations.

Figure 3:
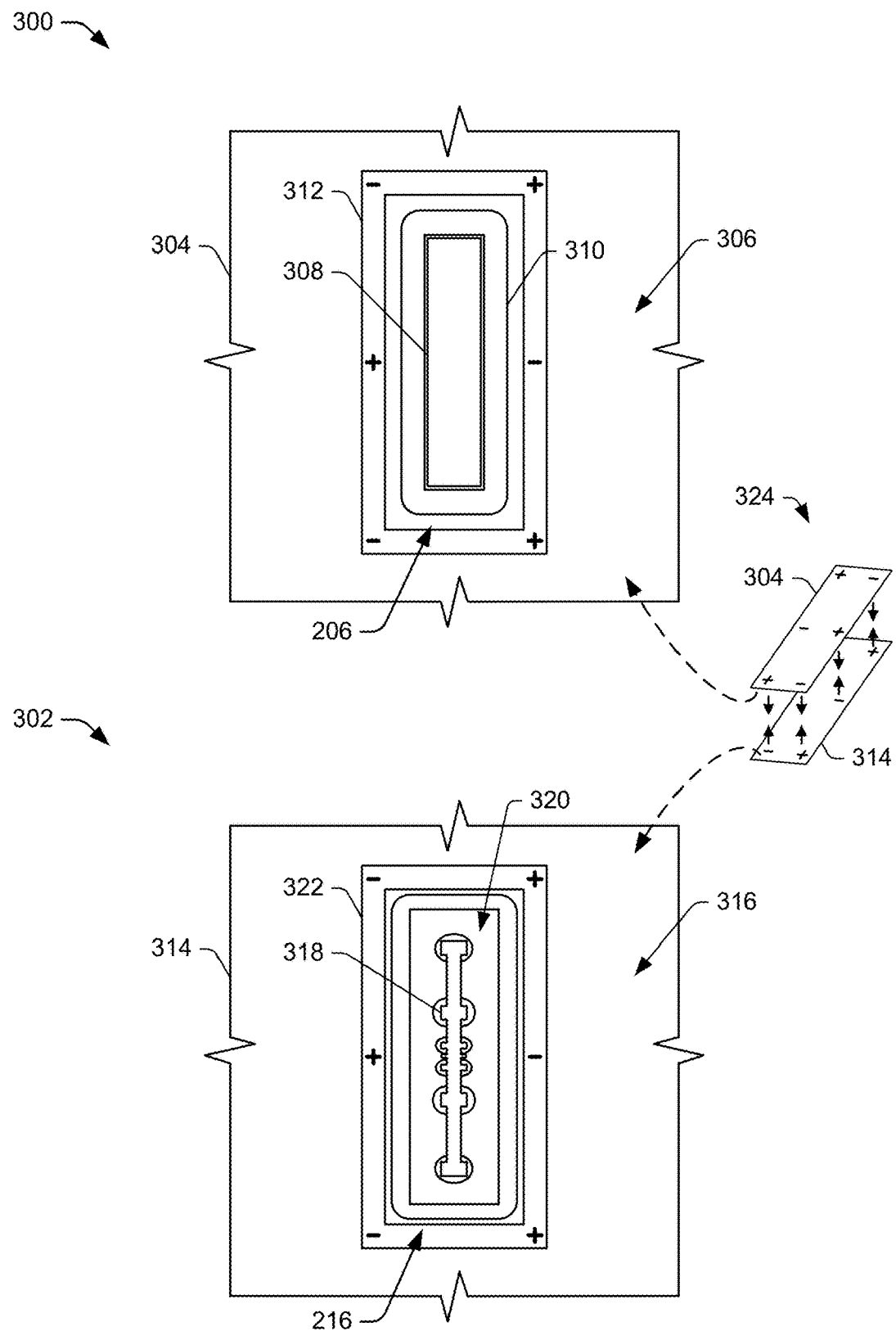
FIG. 3 illustrates an example implementation of a blind battery connector.

FIG. 3 illustrates an example implementation of a blind battery connector. The blind battery connector is a coupling apparatus for engaging a blind battery connection for placing or replacing a battery. The illustrated example includes a front view 300 of an example battery connector (e.g., the battery connector 206 in FIG. 2) and a front view 302 of an example system-side connector (e.g., the system-side connector 216 in FIG. 2).

The battery connector 206 may be implemented on a protection circuit module 304 (PCM 304), which protects the battery pack from overcharge voltage, overdischarge voltage, overcharge current, overdischarge current, short-circuit protection, and, optionally, zero-voltage lockout protection. In particular, the battery connector 206 is disposed on a first side 306 of the PCM 304. In some aspects, the first side 306 of the PCM 304 may be substantially orthogonal to a mating direction of the battery connector 206. In some other aspects, the first side 306 of the PCM 304 is non-orthogonal to the mating direction of the battery connector 206.

The battery connector 206 may include a contact surface 308 for coupling with the system-side connector 216. The contact surface 308 may include one or more electrical contacts (e.g., pins, tabs, springs, wires). In aspects, the battery connector 206 may also include a structure 310 protruding from the PCM 304 and surrounding the contact surface 308. The structure 310 may provide protection in directions orthogonal to a mating direction of the battery connector 206. The structure 310 may also be used for aligning the contact surface 308 with corresponding electrical contacts on the system-side connector 216.

The battery connector 206 may also include a polarity-oriented magnet connector (e.g., first magnet connector 312) disposed proximate to the contact surface 308 and/or the structure 310. For example, the first magnet connector 312 may be proximate to the contact surface 308 or the structure 310 by being adjacent to the contact surface or the structure 310 and/or by being arranged at a distance of less than a first threshold distance of, e.g., 5 millimeters (mm) to the contact surface 308 or the structure 310. The first threshold distance may be any suitable distance, including 0.5 mm, 1 mm, 1.25 mm, 2 mm, 3 mm, 5 mm, 8 mm, and so on. The first magnet connector 312 may include any suitable number of polarity changes throughout the first magnet connector 312. For example, as illustrated in FIG. 3, the first magnet connector 312 may include six polarity changes between positive and negative charges around the contact surface 308 of the battery connector 206.

The system-side connector 216 may be implemented on a circuit board 314, including a PCB such as a main logic board (MLB) of the electronic device 202. In particular, the system-side connector 216 is disposed on a first side 316 of the circuit board 314. The system-side connector 216 includes a mating surface 318 for mating with the contact surface 308 of the battery connector 206. The mating surface 318 may include one or more electrical contacts (e.g., pins, tabs, springs, wires), which correspond to the electrical contacts on the battery connector 206. In aspects, the mating surface 318 includes a recessed area 320 configured to receive the structure 310 on the battery connector 206 when coupling to the battery connector 206. Receiving the structure 310 into the recessed area 320 provides alignment for coupling the electrical contacts on the mating surface with the electrical contacts on the battery connector 206.

In addition, the system-side connector 216 includes a polarity-oriented magnet connector (e.g., second magnet connector 322), which corresponds to the first magnet connector 312 of the battery connector 206. The second magnet connector 322 may be disposed proximate to the mating surface 318 or the recessed area 320 by being adjacent to the mating surface 318 or the recessed area 320 and/or by being arranged at a distance of less than a second threshold distance of, e.g., 5 millimeters to the mating surface 318 or the recessed area 320. The second threshold distance may be any suitable distance, including 0.5 mm, 1 mm, 1.25 mm, 2 mm, 3 mm, 5 mm, 8 mm, and so on. The polarity of the second magnet connector 322 complements the polarity of the first magnet connector 312 such that, when the battery connector 206 and the second magnet connector 322 are brought into proximity of one another and are facing each other in the mating direction and proper orientation (e.g., example view 324), a magnetic attraction force is generated to couple the magnet connectors 312 and 322 together.

In aspects, the first and second magnet connectors 312 and 322 can be implemented as permanent magnets or temporary magnets. The battery connector 206 and/or the system-side connector 216 may include connectors such as wire to board (W2B), board to board (B2B), pogo pin, and so on. The first and second magnet connectors 312 and 322 may be any suitable magnetic material, including a paramagnetic material (e.g., nickel) or ferromagnetic material (e.g., iron, neodymium).

In some implementations, the first magnet connector 312 may include one or more permanent magnets (e.g., small magnetic beads or grains) embedded within the battery connector 206. Similarly, the second magnet connector 322 may include one or more permanent magnets (e.g., small magnetic beads or grains) embedded within the system-side connector 216. These embedded permanent magnets may include magnet chunks with house and/or mixed magnet particles within plastics.

In some implementations, the first magnet connector 312 may include one or more temporary magnets (e.g., small magnetic beads or grains) embedded within the battery connector 206. Similarly, the second magnet connector 322 may include one or more temporary magnets (e.g., small magnetic beads or grains) embedded within the system-side connector 216. These embedded temporary magnets may include magnet chunks with house and/or mixed magnet particles within plastics. In some aspects, the battery 204 provides electric current to the battery connector 206 (e.g., via a planar coil or a solenoid) to generate a magnetic field that can induce temporary magnetism. When the system-side connector 216 is exposed to the magnetic field, polarity is induced in the second magnet connector 322, causing the first and second magnet connectors 312 and 322, respectively, to magnetically attract one another.

As illustrated, the first magnet connector 312 may include an O-type shape that is rectangular or rounded and that surrounds or frames the contact surface 308 (and the structure 310) on the battery connector 206. Similarly, the second magnet connector 322 may include an O-type shape that is rectangular or rounded and that surrounds or frames the mating surface 318 (and the recessed area 320) on the system-side connector 216.

In some implementations, the first magnet connector 312 is a fixture that is separate and independent from the battery connector 206. Similarly, the second magnet connector 322 may be a fixture that is separate and independent from the system-side connector 216. These fixtures may be a single fixture or separate fixtures. These fixtures may be implemented as a magnet scaffolding fixture, which forms a frame around the battery connector 206 and the system-side connector 216, respectively. The fixture may, for example, have a U-shape, which may be used for B2B connectors. In another example, the fixture has a frame with a notch (e.g., small opening in one side of the frame), which may be used for W2B connectors and/or pogo pins. The fixture is reusable in that it can be removably placed around the battery connector 206 and/or the system-side connector 216 to enable automatic alignment and coupling of the battery and system-side connectors 206 and 216. After the battery and system-side connectors 206 and 216 are coupled together, the fixture can be removed and used again on another set of connectors.

In another example, the fixture(s) may have a hinge that enables the fixture(s) to open and close. For instance, the fixture may close around the battery connector 206 and/or the system-side connector 216 and then open and be removed from the battery and system-side connectors 206 and 216. In yet another example, the fixture may have two U-shaped sections that can be placed end-to-end to surround the battery connector 206 and/or the system-side connector 216 and then be separated for removal from those connectors. Accordingly, the fixture can have any suitable shape usable to provide adequate magnetic coverage for aligning and coupling the battery and system-side connectors 206 and 216, provided the fixture does not lock the connector (e.g., the battery connector 206 or the system-side connector 216) and fixture together after assembly if the fixture is intended to be reused.

Figure 4A:
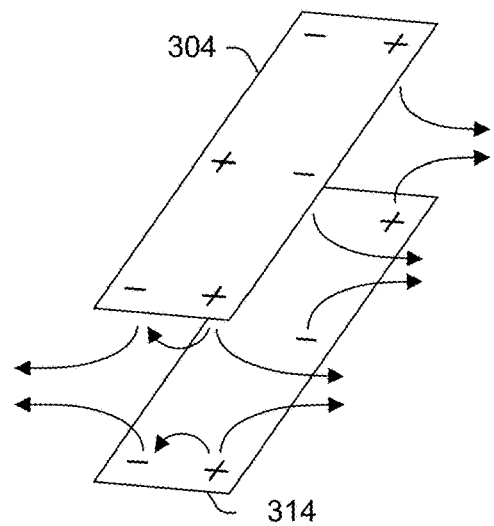
FIGS. 4A and 4B illustrate example implementations of the blind battery connector controlling orientation of the battery connector with respect to the system-side connector.
Figure 4B:
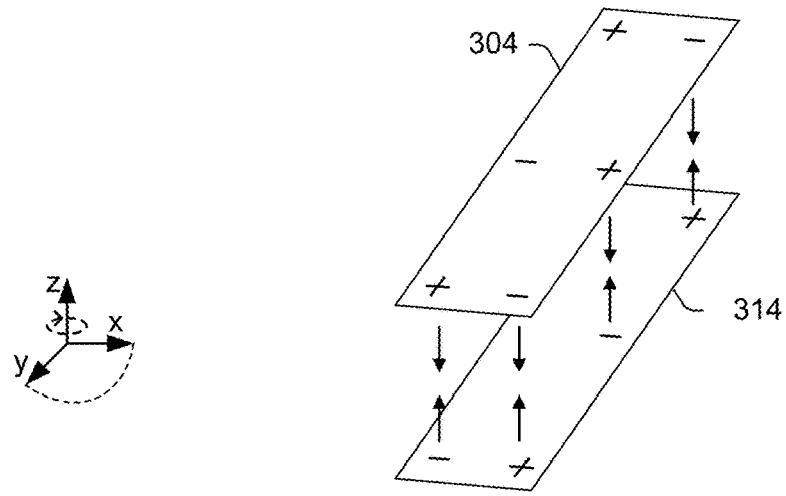

FIGS. 4A and 4B illustrate example implementations of the blind battery connector controlling orientation of the battery connector with respect to the system-side connector. In particular, FIG. 4A illustrates a reverse polarity implementation 400 in which the polarity-oriented magnet connectors repel each other and prevent coupling in a wrong orientation. For example, if a user attempts to connect the battery connector 206 to the system-side connector 216 in an "upside-down" or reverse configuration, the respective magnet connectors 312 and 322 repel each other due to reverse polarity (e.g., positive on positive, negative on negative). This reverse polarity prevents the user from forcing an incorrect connection and potentially causing damage to the battery connector 206 and/or the system-side connector 216.

FIG. 4B illustrates a correct-polarity implementation 402 in which the polarity-oriented magnet connectors attract each other and provide coupling in a correct orientation. Here, the battery connector 206 is correctly oriented with respect to the system-side connector 216 such that the polarity of the battery connector 206 is complementary to the polarity of the system-side connector 216. For example, positive charges on the battery connector 206 align with negative charges on the system-side connector 216 and vice versa. Similarly, negative charges on the battery connector 206 align with positive charges on the system-side connector 216. Having multiple points of magnetic coupling helps align the battery connector 206 to the system-side connector 216 in multiple dimensions. For example, if the mating direction is considered a z-direction, the multiple points of magnetic coupling provide alignment and stability in both the x-direction and the y-direction.

Figure 5:
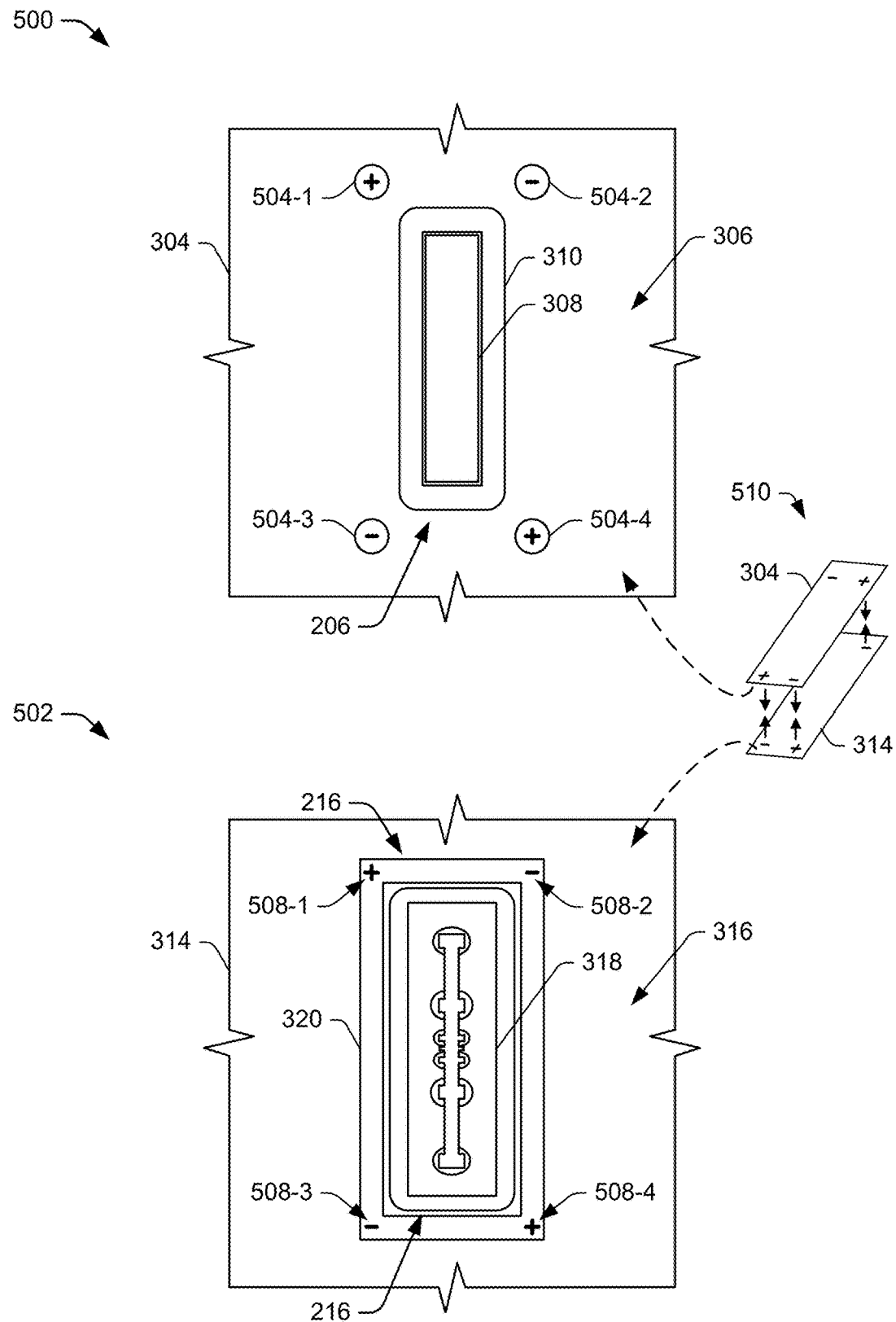
FIG. 5 illustrates an example implementation of a blind battery connector including embedded magnets.

FIG. 5 illustrates an example implementation of a blind battery connector including embedded magnets. The illustrated example includes a front view 500 of an example battery connector (e.g., the battery connector 206 in FIG. 2) and a front view 502 of an example system-side connector (e.g., system-side connector 216 in FIG. 2). The battery connector 206 is illustrated as having four individual magnets 504 (e.g., 504-1, 504-2, 504-3, 504-4) embedded within the PCM 304 at various positions around the contact surface 308. Although four individual magnets 504 are illustrated, any suitable number of individual magnets may be implemented (e.g., 2, 3, 4, 5, 6, 7, 8). The multiple individual magnets 504 define multiple magnetic poles, which help define the orientation of the battery connector 206 when magnetically coupling to the system-side connector 216. The system-side connector 216 may include a magnet connector 506 substantially forming a frame around the mating surface 318 and having different polarities 508 (e.g., 508-1, 508-2, 508-3, 508-4) along its length that correspond (e.g., opposing polarity for magnetic coupling) to the polarities of the individual magnets 504 on the battery connector 206.

For example, from the front views 500 and 502 of the battery connector 206 and the system-side connector 216, respectively, the polarities of the magnets appear to have the same arrangement. This arrangement results in alignment of opposing polarities when the battery connector 206 and the system-side connector 216 face each other (e.g., 510) in the mating direction. Accordingly, in the example shown in FIG. 5, four magnetic poles are provided on each side of the blind battery connector (e.g., battery connector 206 and system-side connector 216) to prevent misalignment and/or incorrect orientation of the battery connector 206 relative to the system-side connector 216.

Figure 6:
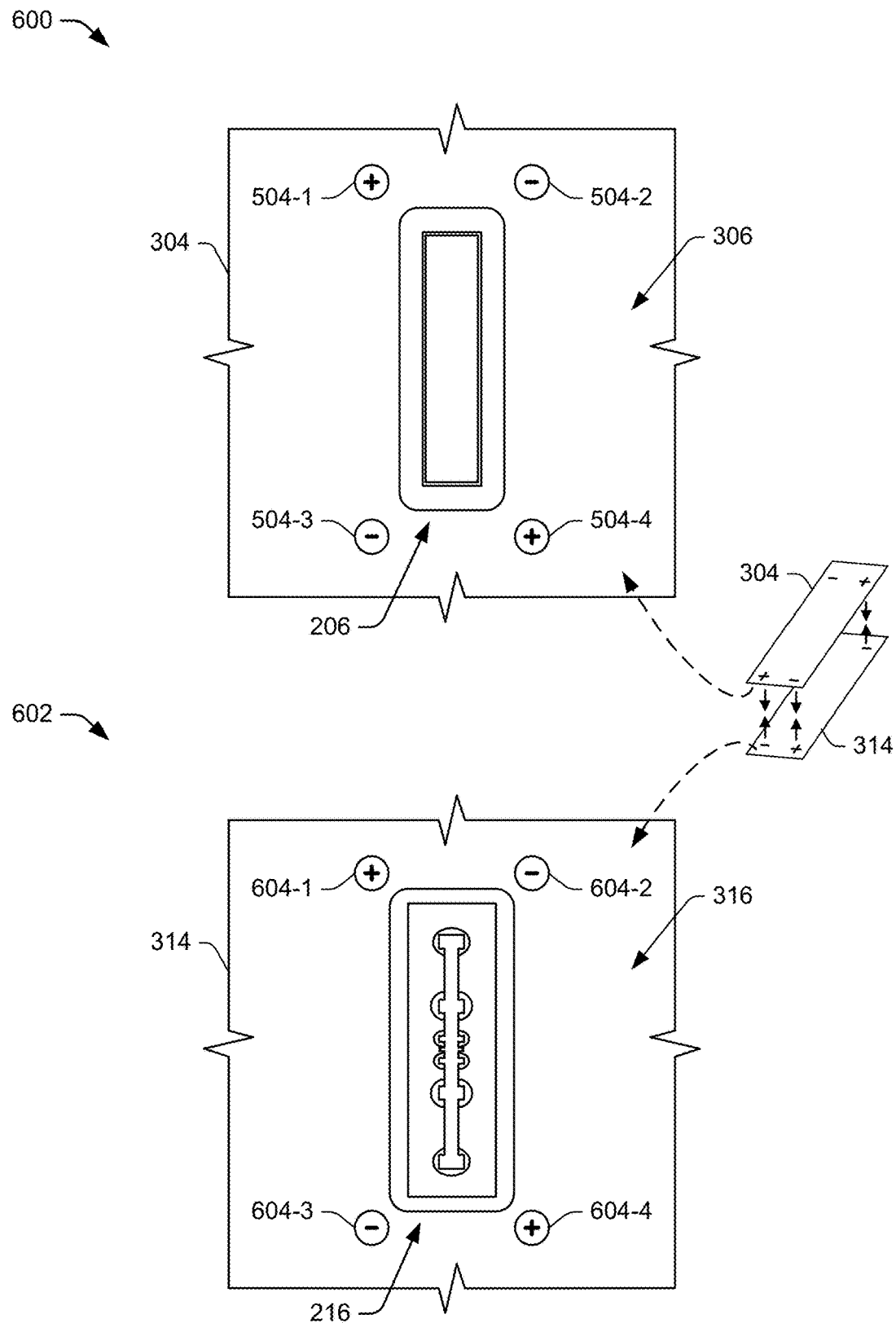
FIG. 6 illustrates another example implementation of a blind battery connector including embedded magnets.

FIG. 6 illustrates another example implementation of a blind battery connector including embedded magnets. The illustrated example includes a front view 600 of an example battery connector (e.g., the battery connector 206 in FIG. 2) and a front view 602 of an example system-side connector (e.g., system-side connector 216 in FIG. 2). In this example, the battery connector 206 is similar to the battery connector 206 shown in FIG. 5 but the system-side connector 216 includes a corresponding set of individual magnets 604 (e.g., 604-1, 604-2, 604-3, 604-4) that are embedded within the first side 316 of the circuit board 314 and that correspond to the individual magnets 504 in the battery connector 206 in both position and polarity. The example illustrated in FIG. 6 may reduce manufacturing costs by using fewer materials to implement the blind battery connector.

Figure 7:
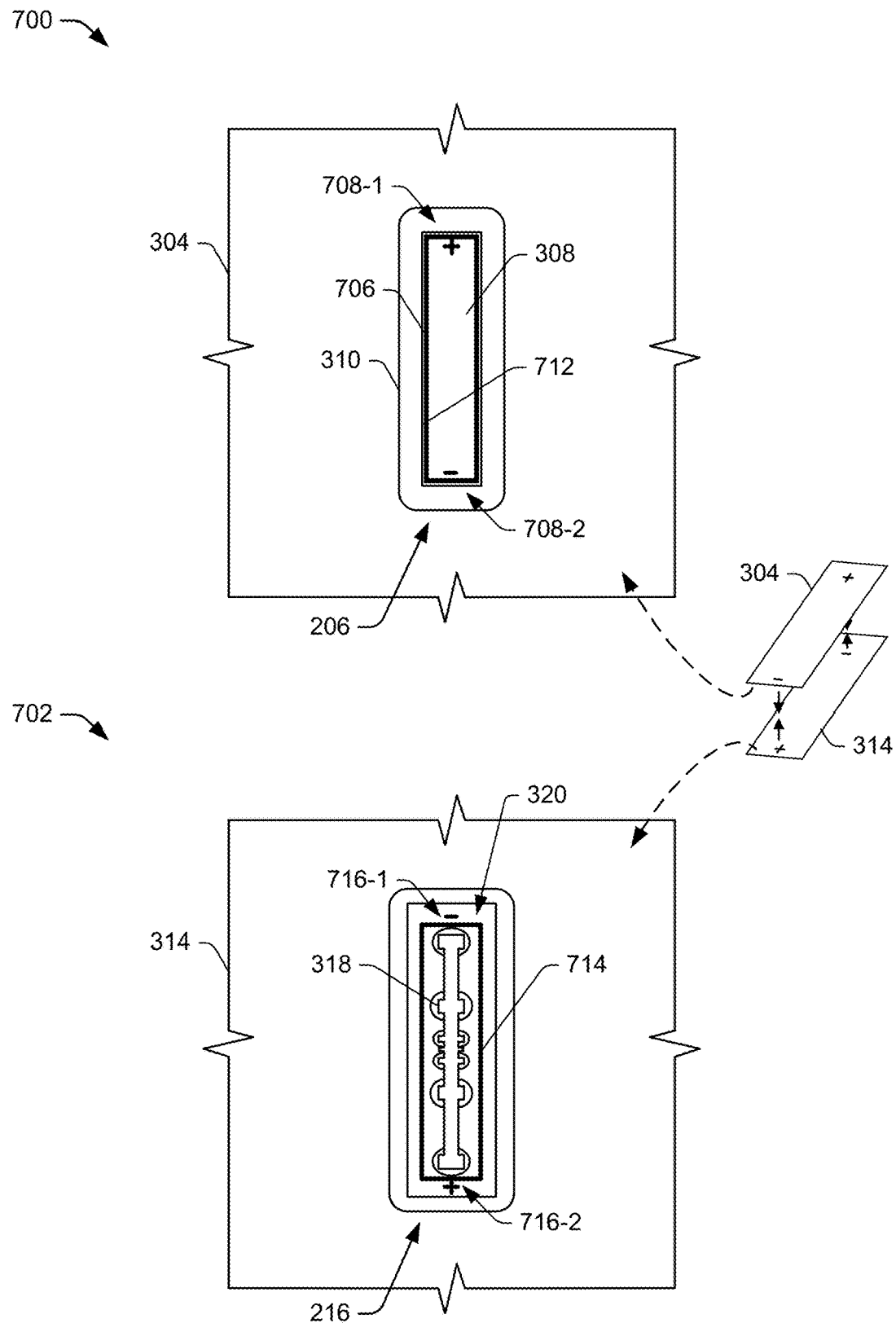
FIG. 7 illustrates another example implementation of a blind battery connector with embedded magnets.

FIG. 7 illustrates another example implementation of a blind battery connector with embedded magnets. The illustrated example includes a front view 700 of an example battery connector (e.g., the battery connector 206 in FIG. 2) and a front view 702 of an example system-side connector (e.g., system-side connector 216 in FIG. 2). The battery connector 206 includes an embedded magnet connector (e.g., first embedded magnet connector 706) that is embedded within the battery connector 206 such that the first embedded magnet connector 706 is disposed between the structure 310 and the contact surface 308. Opposing ends of the first embedded magnet connector 706 may have opposite polarities relative to one another. In the illustrated example, the first embedded magnet connector 706 includes a positive polarity 708-1 at a first end and a negative polarity 708-2 at a second, opposing end. Additional polarity changes may be implemented along the length of the first embedded magnet connector 706, along a perimeter of the contact surface, or along an inner surface 712 of the structure 310 surrounding the contact surface 308.

The system-side connector 216 may also include an embedded magnet connector (e.g., second embedded magnet connector 714) that is embedded within the system-side connector 216 such that the second embedded magnet connector 714 is in or around the recessed area 320 of the mating surface 318. The second embedded magnet connector 714 may have opposing ends having opposite polarities. For example, the second embedded magnet connector 714 may have a negative polarity 716-1 at a first end and a positive polarity 716-2 at a second, opposing end. In this way, when the battery connector 206 and the system-side connector 216 face one another in the mating direction, the respective polarities of the first and second embedded magnet connectors 312 and 322, provide a magnetic force that aligns the battery and system-side connectors 206 and 216 in a single orientation and repels alternative orientations.

Figure 8:
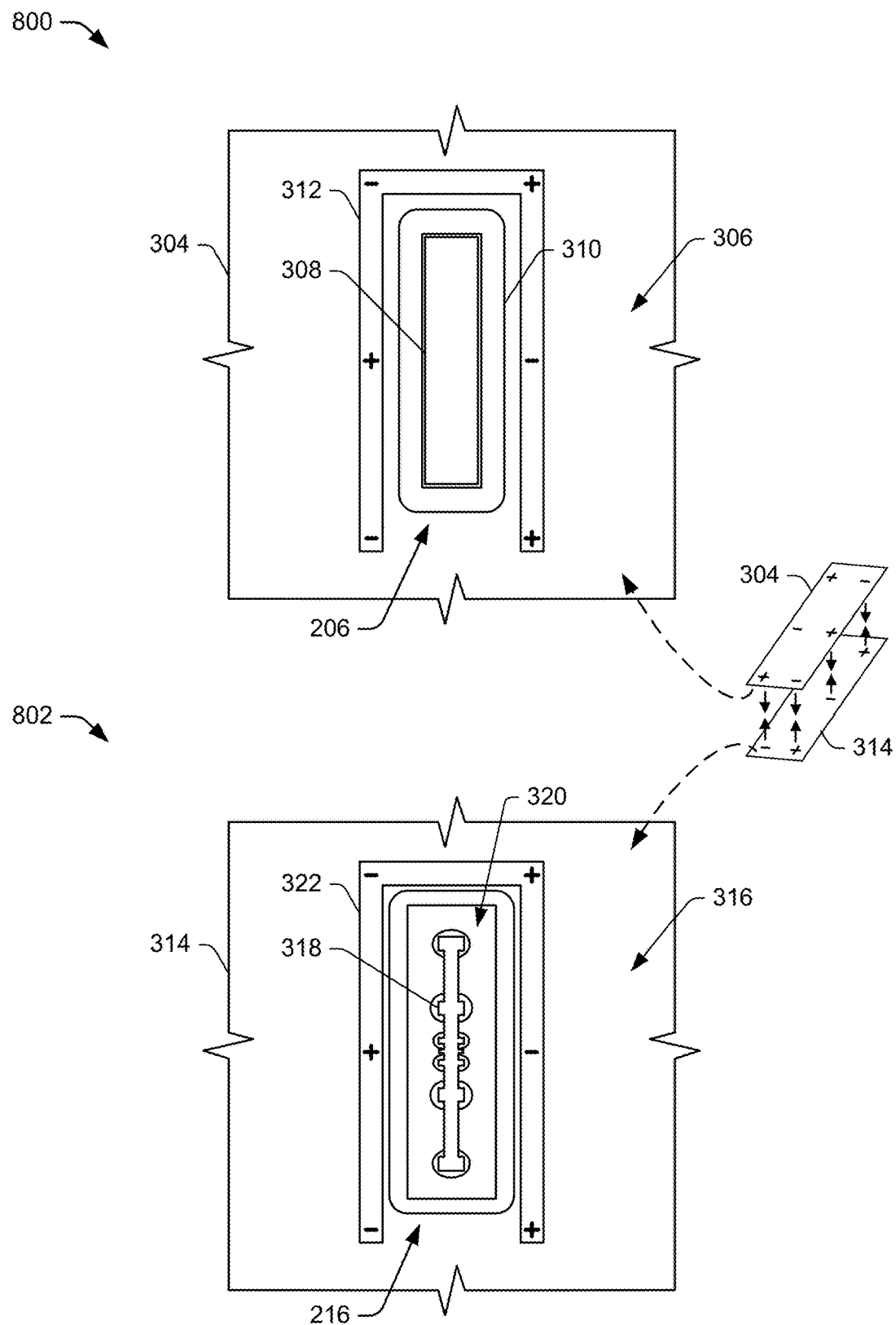
FIG. 8 illustrates an example implementation of a blind battery connector with U-shaped magnets.

FIG. 8 illustrates an example implementation of a blind battery connector with U-shaped magnets. The illustrated example includes a front view 800 of an example battery connector (e.g., the battery connector 206 in FIG. 2) and a front view 802 of an example system-side connector (e.g., system-side connector 216 in FIG. 2).

In this example, the first magnet connector 312 has a U-shape that partially surrounds (e.g., frames) the contact surface 308 and its surrounding structure 310 on the battery connector 206. The second magnet connector 322 also has a U-shape that partially surrounds the mating surface 318 of the system-side connector 216. In some implementations, the U-shaped connectors (e.g., the first and second magnet connectors 312 and 322) may be embedded within the battery connector 206 and the system-side connector 216, respectively. In some implementations, the first and second magnet connectors 312 and 322 may be separate and independent from the PCM 304 and circuit board 314 such that the first and second magnet connectors 312 and 322 can be assembled to the PCM 304 and circuit board 314 and subsequently removed (e.g., after the contact surface 308 and the mating surface 318 are coupled together).

Figure 9:
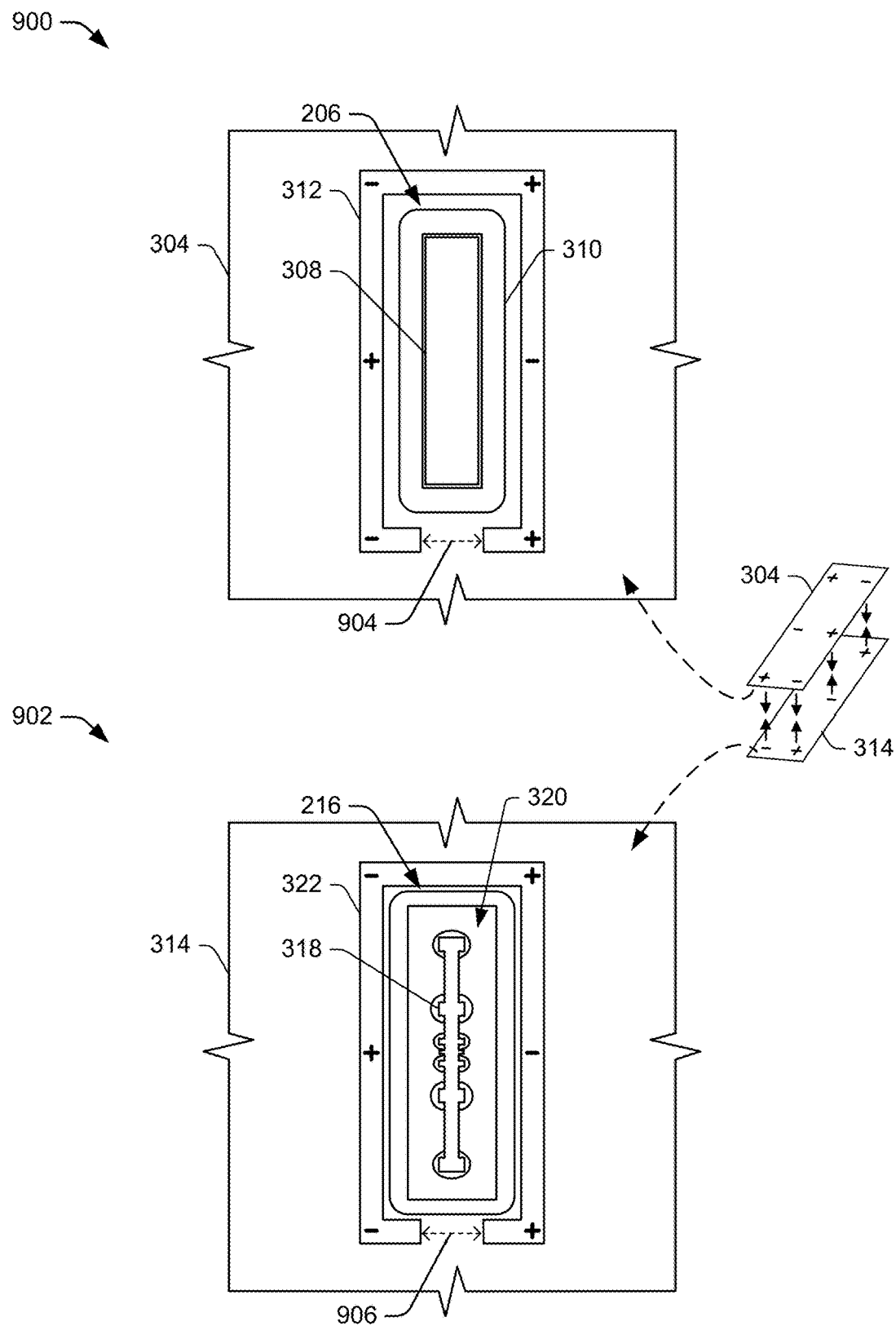
FIG. 9 illustrates another example implementation of a blind battery connector with notch-type magnets.

FIG. 9 illustrates another example implementation of a blind battery connector with notch-type magnets. The illustrated example includes a front view 900 of an example battery connector (e.g., the battery connector 206 in FIG. 2) and a front view 902 of an example system-side connector (e.g., system-side connector 216 in FIG. 2). Here, the first and second magnet connectors 312 and 322 each has a notch-type shape. For example, the magnet connectors 312 and 322 form a frame with an opening in one or more sides of the frame. In FIG. 9, each of the first and second magnet connectors 312 and 322 is illustrated with a single notch or opening (e.g., first opening 904, second opening 906). However, one or both of the first and second magnet connectors 312 and 322 may include multiple openings, as is further described herein.

Here, the first and second openings 904 and 906 each have a width that is greater than a width of any protrusions (e.g., the electrical contacts) on the contact surface 308 of the battery connector 206 or on the mating surface 318 of the system-side connector 216. Such a relative size of the width of the first and second openings 904 and 906 enables the first and second magnet connectors 312 and 322 to be removed from the battery connector 206 and system-side connector 216 without causing damage to such protrusions. The removal of the first and second magnet connectors 312 and 322 may occur after coupling the battery connector 206 to the system-side connector 216.

Figure 10:
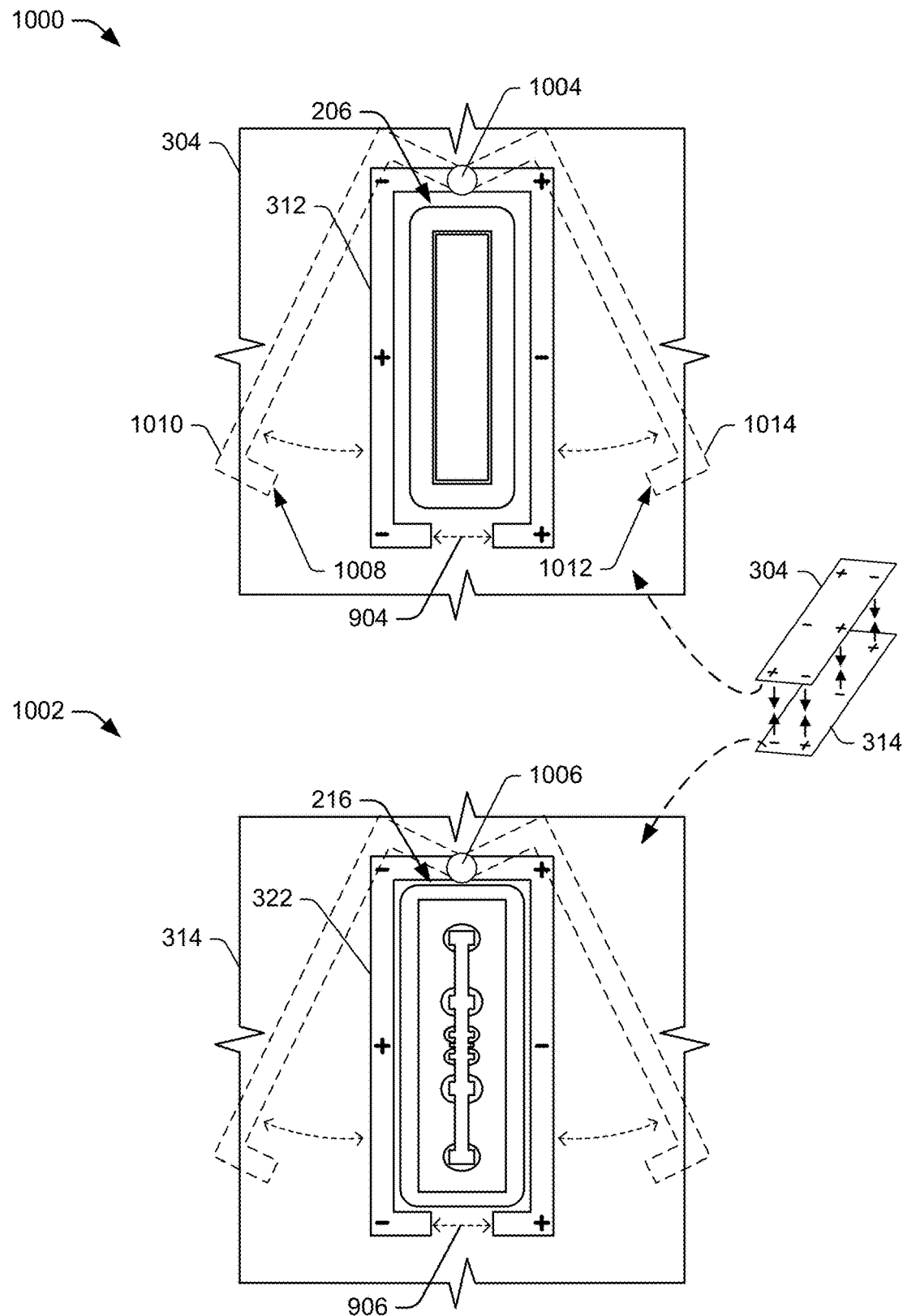
FIG. 10 illustrates another example implementation of a blind battery connector with hinged magnets.

FIG. 10 illustrates another example implementation of a blind battery connector with hinged magnets. The illustrated example includes a front view 1000 of an example battery connector (e.g., the battery connector 206 in FIG. 2) and a front view 1002 of an example system-side connector (e.g., system-side connector 216 in FIG. 2). Here, the first and second magnet connectors 312 and 322 each have a hinge (e.g., hinge 1004, hinge 1006) that provides a hinged connection between two sections and enables rotatable movement of at least one of the portions about the hinge. Using a hinged connection in each of the first and second magnet connectors 312 and 322 enables the respective openings (e.g., openings 904 and 906) to be minimized. For example, the tip or end (e.g., first end 1008) of a first portion 1010 of the first magnet connector 312 may abut the tip or end (e.g., second end 1012) of a second portion 1014 of the first magnet connector 312 when the hinged connection is closed. The second magnet connector 322 may be similarly structured. Accordingly, when implemented as a scaffolding fixture with a hinged connection between the two sections, the blind battery connector may be an O-type fixture. The blind battery connector may also be a notch-type fixture or a U-type fixture but the hinge enables the blind battery connector to be removed from the assembly without requiring the openings (e.g., openings 904 and 906) provided by the notch-type and/or U-type fixtures.

Figure 11:
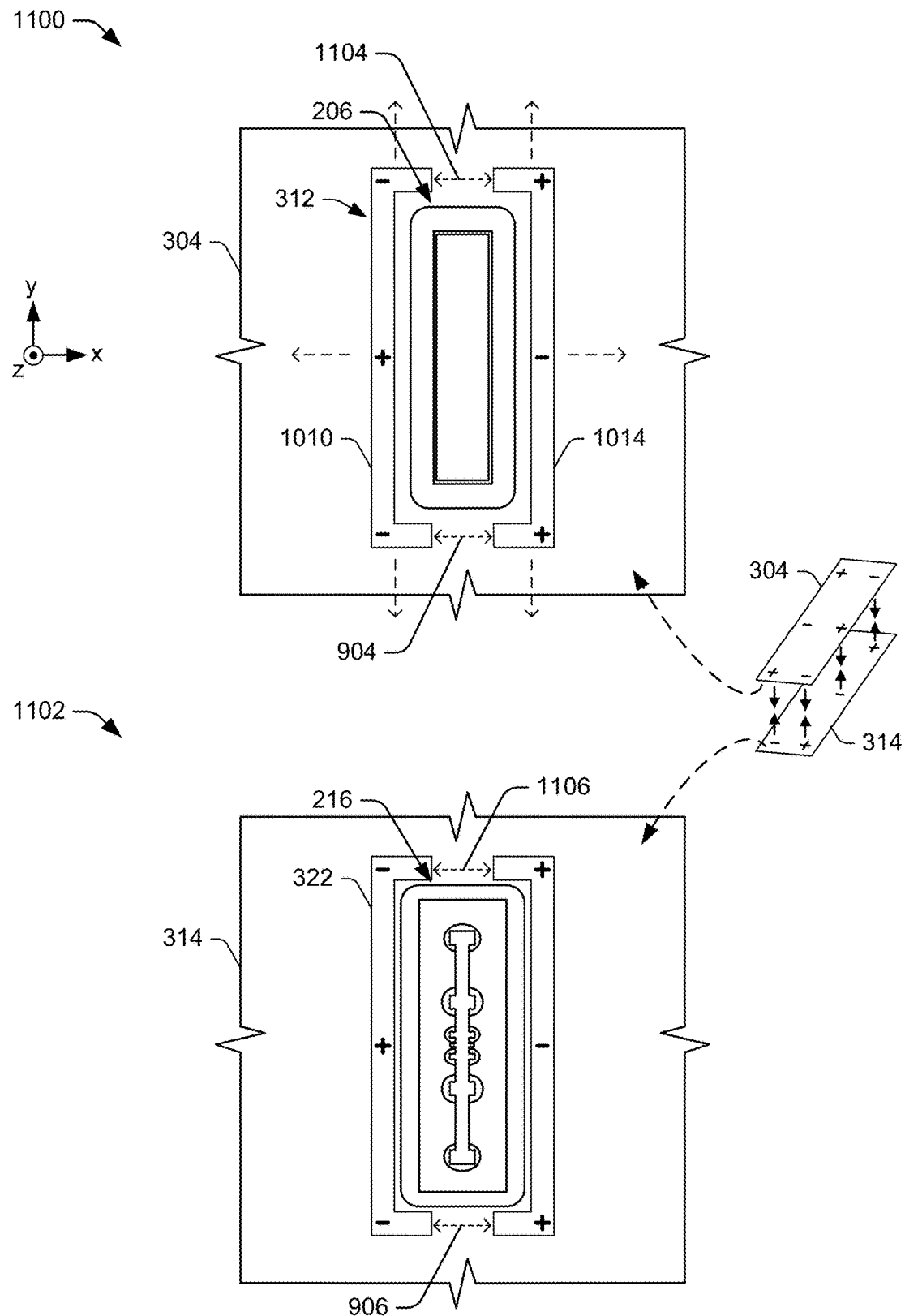
FIG. 11 illustrates another example implementation of a blind battery connector with multiple notches.

FIG. 11 illustrates another example implementation of a blind battery connector with multiple notches. The illustrated example includes a front view 1100 of an example battery connector (e.g., the battery connector 206 in FIG. 2) and a front view 1102 of an example system-side connector (e.g., system-side connector 216 in FIG. 2). Here, each of the first and second magnet connectors 312 and 322 has multiple openings (e.g., notches), resulting in two U-type (or C-type) shapes oriented to provide at least a partial frame. For example, the first magnet connector 312 includes the first opening 904 and an additional opening 1104 on an opposing side of the first magnet connector 312. The second magnet connector 322 is similarly structured and includes the opening 906 and an additional opening 1106. Other openings are also contemplated and may be implemented along the length of the first and/or second magnet connectors 312 and 322. Multiple openings in the frame enable removal of the magnet connectors in multiple directions, simplifying and enhancing the reusability of the magnet connectors during assembly (e.g., factory assembly). In one example, the first and second portions 1010 and 1014, respectively, (and corresponding portions of the second magnet connector 322) may be removed in the y-direction, utilizing the openings 904 and 1104. In another example, the first and second portions 1010 and 1014, respectively, (and corresponding portions of the second magnet connector 322) may be moved opposite one another in the x-direction. Such movements of the first and second magnet connectors 312 and 322 may occur after coupling the battery connector 206 to the system-side connector 216.

Although the implementations described in FIGS. 3 to 11 are shown with geometric symmetry, the blind battery connector may also be implemented with geometric asymmetry. Some examples of asymmetric implementations are described with respect to FIGS. 12 and 13.

Figure 12:
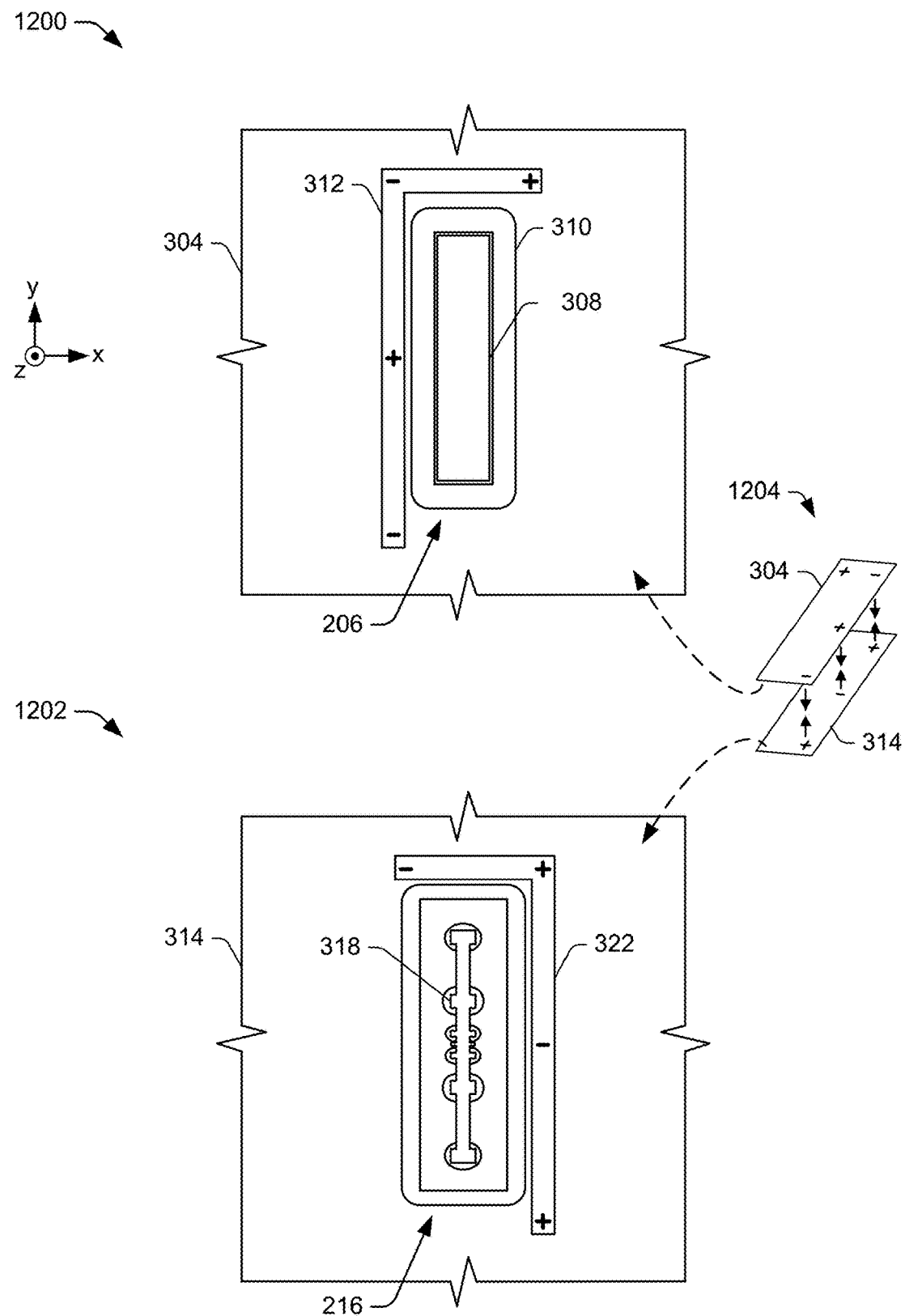
FIG. 12 illustrates an example implementation of a blind battery connector with geometric asymmetry.

FIG. 12 illustrates an example implementation of a blind battery connector with geometric asymmetry. The illustrated example includes a front view 1200 of an example battery connector (e.g., the battery connector 206 in FIG. 2) and a front view 1202 of an example system-side connector (e.g., system-side connector 216 in FIG. 2). Here, the first magnet connector 312 has an L-shape that partially surrounds or frames the contact surface 308 of the battery connector 206. Similarly, the second magnet connector 322 may have an L-shape that partially surrounds or frames the mating surface 318 of the system-side connector 216. Comparatively, in the front views 1200 and 1202, the first and second magnet connectors 312 and 322 are positioned on opposing sides of the contact surface 308 and the mating surface 318, respectively, such that the first and second magnet connectors 312 and 322 appear to be mirrored about the y-axis. Such a configuration enables the first and second magnet connectors 312 and 322 to be aligned with one another when the battery connector 206 and the system-side connector 216 face one another (as shown in view 1204).

Figure 13:
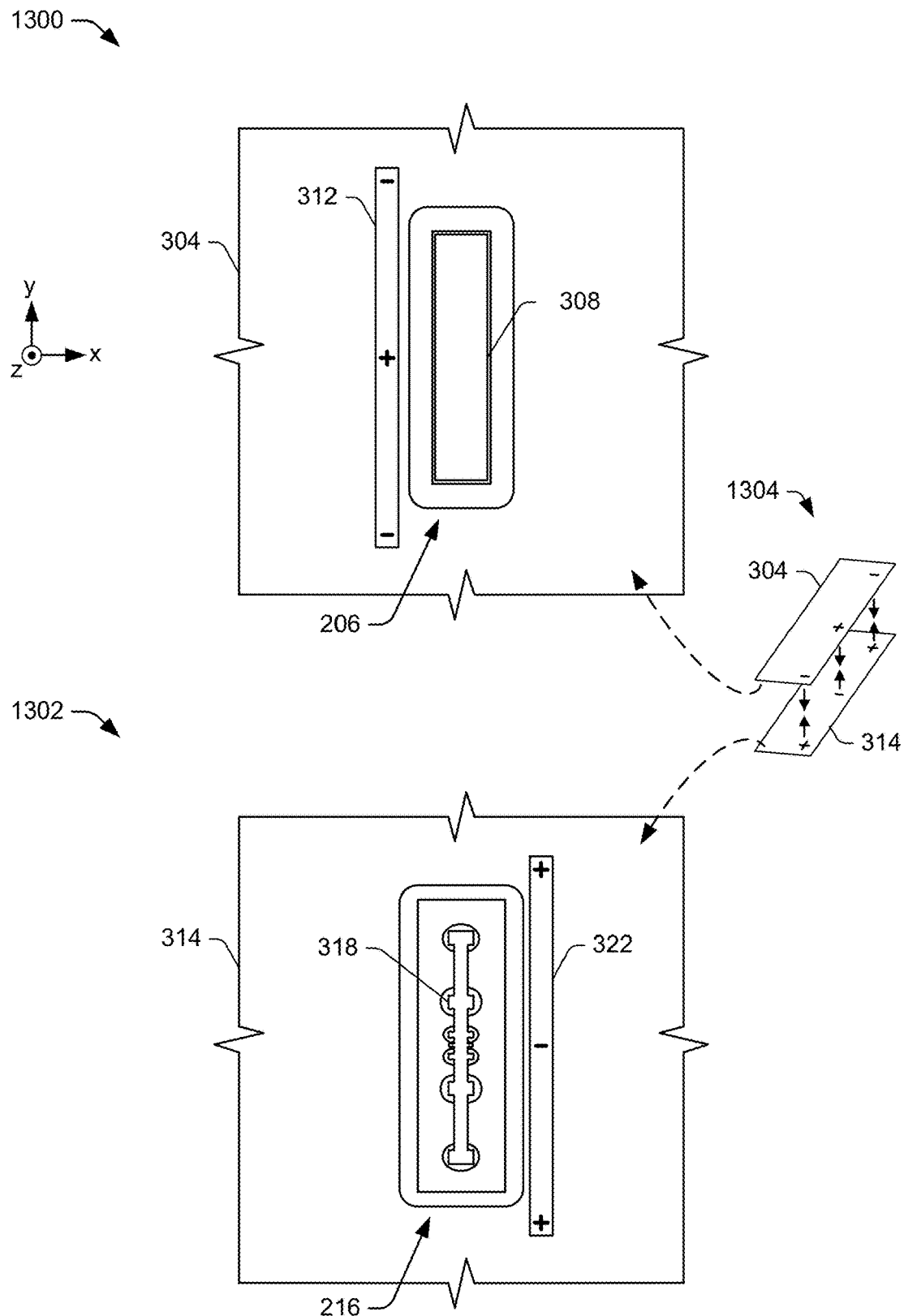
FIG. 13 illustrates another example implementation of a blind battery connector with geometric asymmetry.

FIG. 13 illustrates another example implementation of a blind battery connector with geometric asymmetry. The illustrated example includes a front view 1300 of an example battery connector (e.g., the battery connector 206 in FIG. 2) and a front view 1302 of an example system-side connector (e.g., system-side connector 216 in FIG. 2). Here, the first and second magnet connectors 312 and 322 each has an I-shape (e.g., having a length significantly greater than a width). Accordingly, the first magnet connector 312 is disposed along one side of the contact surface 308 of the battery connector 206, where the side is defined as being lateral to the mating direction (e.g., the z-direction). The first magnet connector 312 may be positioned on any side of the contact surface 308 that is lateral to the mating direction. In addition, the second magnet connector 322 may be positioned on any side of the mating surface 318 that is lateral to the mating direction and which enables the second magnet connector 322 to align with the first magnet connector 312 when the battery connector 206 is mated to the system-side connector 216.

Comparatively, in the front views 1300 and 1302, the first and second magnet connectors 312 and 322 are positioned on opposing sides of the contact surface 308 and the mating surface 318, respectively. In this way, and as shown in view 1304, when the battery connector 206 and system-side connector 216 face one another for coupling in the mating direction and in the proper orientation, the first and second magnet connectors 312 and 322 are aligned with one another and provide the magnetic coupling.

Figure 14:
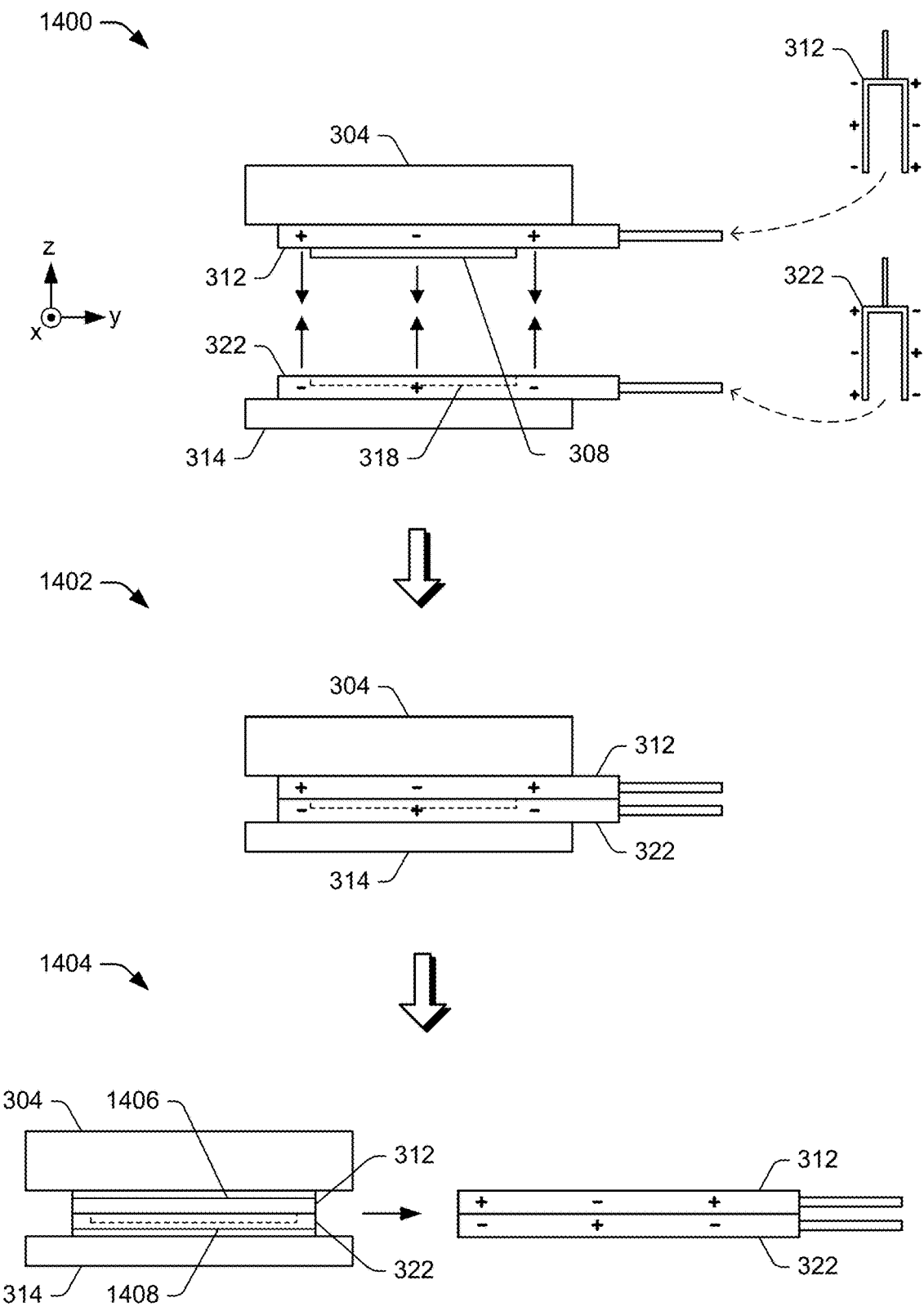
FIG. 14 illustrates an example implementation of a blind battery connector used as a removable magnet scaffolding fixture.

FIG. 14 illustrates an example implementation of a blind battery connector used as a removable magnet scaffolding fixture. In the illustrated example, a sequence of views (e.g., 1400, 1402, and 1404) are shown to depict the use of the blind battery connector as a removable magnet scaffolding fixture for assembly, either factory assembly by an operator or machine or home assembly by an end user. The magnet scaffolding fixture includes two sections, which include the first and second magnet connectors 312 and 322. In an example, one or both sections may be permanent magnets. In another example, one or both sections may be temporarily magnetized, such as by exposure to a magnetic field.

In view 1400, the first magnet connector 312 is removably assembled to the PCM 304. For example, the contact surface 308 or the structure 310 surrounding the contact surface 308 may have a securing feature (e.g., ridge, cutout) along its perimeter that enables the first magnet connector 312 to slidably move in the y-direction relative to the contact surface 308 but prevents movement of the first magnet connector 312 in the z-direction. Similarly, the system-side connector 216 may have a securing feature (e.g., ridge, cutout) along a perimeter or lateral side of the mating surface or of a raised portion having the mating surface. This securing feature on the system-side connector 216 enables the second magnet connector 322 to slidably move in the y-direction relative to the mating surface but prevents movement of the second magnet connector 322 in the z-direction. Example securing features 1406 and 1408 are shown in view 1404 on the battery connector 206 and the system-side connector 216, respectively.

After assembling the two sections of the magnet scaffolding fixture to the battery connector 206 and the system-side connector 216, the battery connector 206 and the system-side connector 216 are brought into proximity to one another. If the battery connector 206 is correctly oriented with the system-side connector 216, the magnetic forces of the polarity-oriented sections of the magnet scaffolding fixture force initial alignment in the x-direction and the y-direction and pull the battery connector 206 and the system-side connector 216 together.

In view 1402, the two sections of the magnet scaffolding fixture are magnetically coupled together, which also caused the coupling of the contact surface 308 on the battery connector 206 with the mating surface 318 on the system-side connector 216 to form an assembly. After the coupling occurs between the contact surface 308 and the mating surface 318, then, as shown in view 1404, the magnet scaffolding fixture may be slidably removed from the assembly in the y-direction.

Using the techniques described herein, a user can use the magnet scaffolding fixture to help automatically guide the user through the blind battery connection safely, consistently, and securely. Such a fixture can be provided to the user in a home-repair kit. The fixture may also be used at factory assembly where an operator can reuse the fixture for a plurality of blind battery connections.

Figure 15:
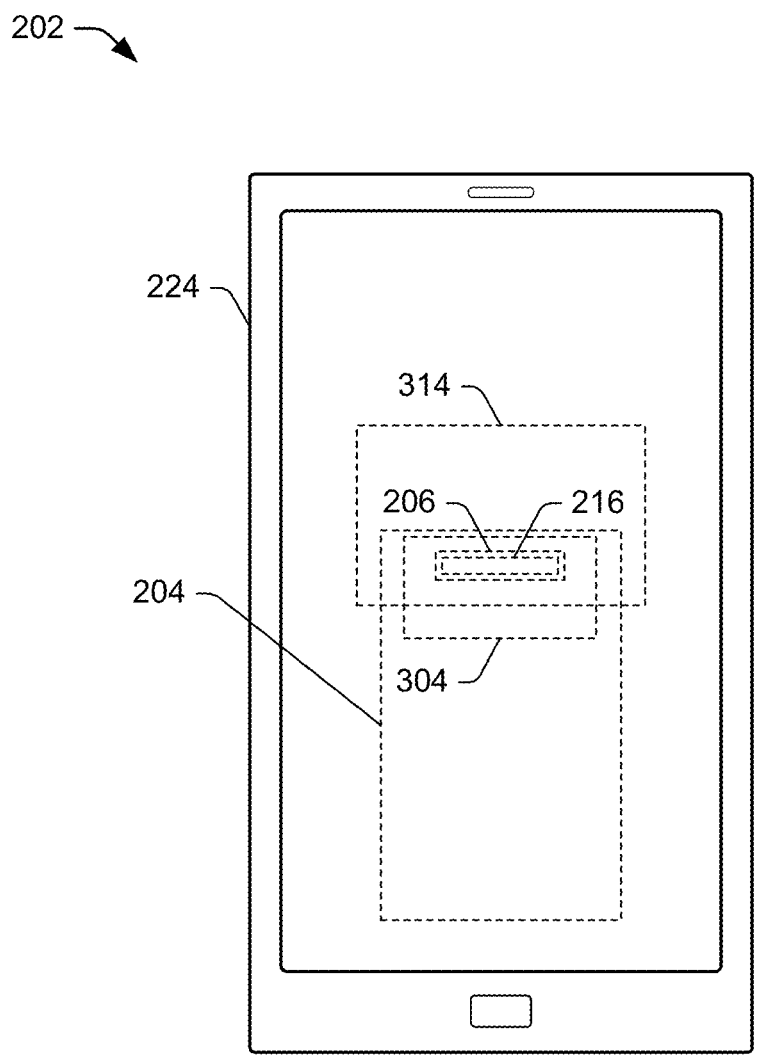
FIG. 15 illustrates an example electronic device in which a blind battery connector can be implemented.

FIG. 15 illustrates an example electronic device in which a blind battery connector can be implemented. The electronic device 202 is illustrated as having an enclosure (e.g., the enclosure 224). Within the enclosure 224 (e.g., inside the electronic device 202) is a PCB (e.g., the circuit board 314) on which the system-side connector 216 is attached. Also within the enclosure 224 is a battery pack (e.g., the battery 204) having the PCM 304 attached thereto and the battery connector 206 attached to the PCM 304. The battery connector 206 and the system-side connector 216 are electrically coupled together.

The magnet connectors 312 and 322 described herein are implemented during assembly (e.g., placing or replacing) of the battery 204 within (e.g., internally to) the enclosure 224 of the electronic device 202. If the user attempts to place and connect the battery 204 in an incorrect orientation relative to the system-side connector 216, the magnet connectors 312 and 322 magnetically repel one another and prevent the coupling of the battery connector 206 to the system-side connector 216. When the battery 204 is correctly oriented relative to the system-side connector 216, the magnetic attraction force of the magnet connectors 312 and 322 not only pulls the battery connector 206 toward the system-side connector 216 but also causes the battery connector 206 to be properly aligned with the system-side connector 216 for optimal coupling. After assembly, the enclosure 224 is closed and the battery 204 remains coupled to the circuit board 314 of the electronic device 202 via the battery connector 206 and the system-side connector 216.

Example Environments and Devices

Figure 16:
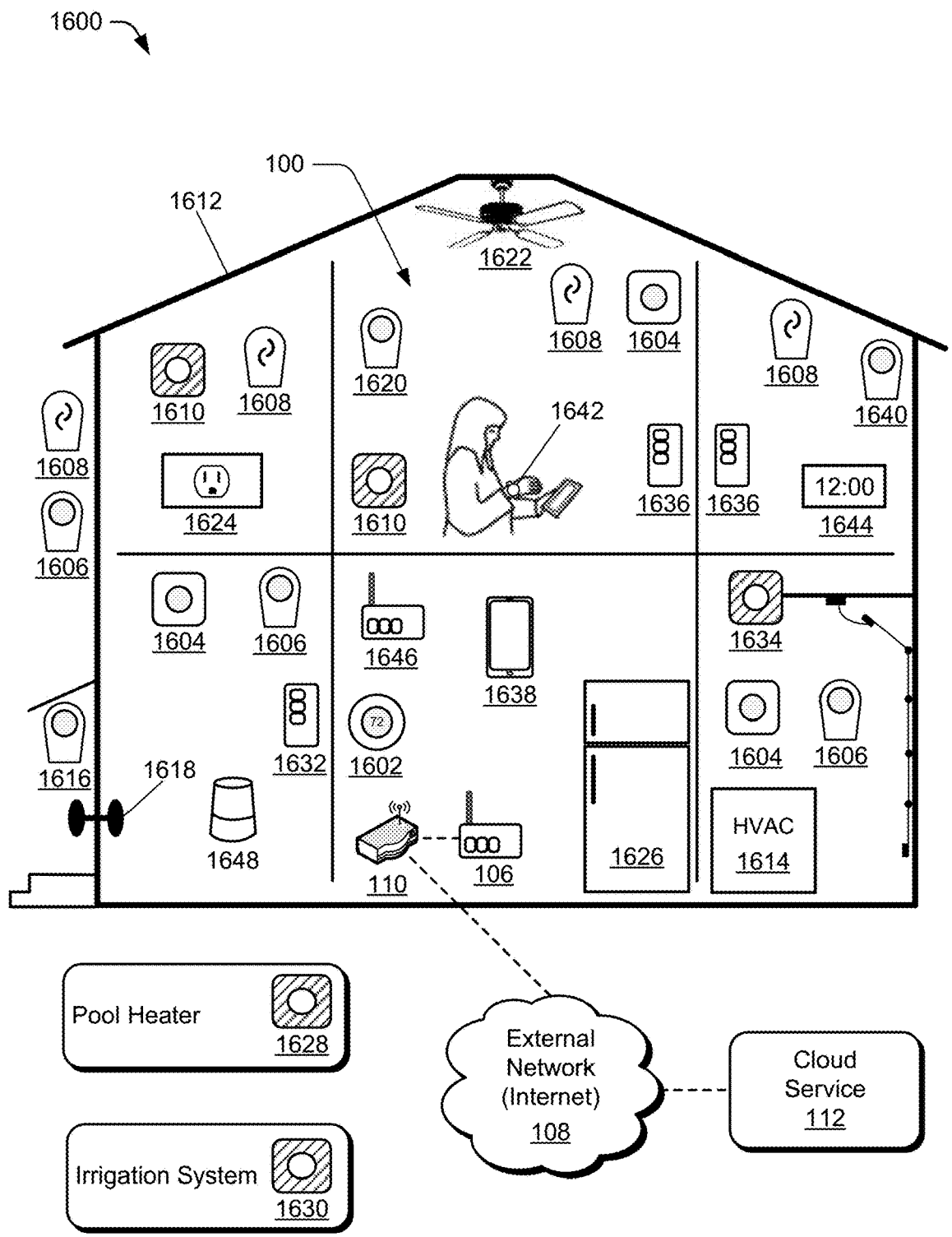
FIG. 16 illustrates an example environment in which a home area network, as described with reference to FIG. 1, and aspects of a blind battery connector can be implemented.

FIG. 16 illustrates an example environment 1600 in which a home area network, as described with reference to FIG. 1, and aspects of a blind battery connector can be implemented. Generally, the environment 1600 includes the home area network (HAN) implemented as part of a home or other type of structure with any number of wireless network devices (e.g., wireless network devices 102) that are configured for communication in a wireless network. For example, the wireless network devices can include a thermostat 1602, hazard detectors 1604 (e.g., for smoke and/or carbon monoxide), cameras 1606 (e.g., indoor and outdoor), lighting units 1608 (e.g., indoor and outdoor), and any other types of wireless network devices 1610 that are implemented inside and/or outside of a structure 1612 (e.g., in a home environment). In this example, the wireless network devices can also include any of the previously described devices, such as a border router 106, as well as the electronic device 202.

In the environment 1600, any number of the wireless network devices can be implemented for wireless interconnection to wirelessly communicate and interact with each other. The wireless network devices are modular, intelligent, multi-sensing, network-connected devices that can integrate seamlessly with each other and/or with a central server or a cloud-computing system to provide any of a variety of useful automation objectives and implementations. An example of a wireless network device that can be implemented as any of the devices described herein is shown and described with reference to FIG. 16.

In implementations, the thermostat 1602 may include a Nest® Learning Thermostat that detects ambient climate characteristics (e.g., temperature and/or humidity) and controls an HVAC system 1614 in the home environment. The learning thermostat 1602 and other network-connected devices "learn" by capturing occupant settings to the devices. For example, the thermostat learns preferred temperature set points for mornings and evenings and when the occupants of the structure are asleep or awake, as well as when the occupants are typically away or at home.

A hazard detector 1604 can be implemented to detect the presence of a hazardous substance or a substance indicative of a hazardous substance (e.g., smoke, fire, or carbon monoxide). In examples of wireless interconnection, a hazard detector 1604 may detect the presence of smoke, indicating a fire in the structure, in which case the hazard detector that first detects the smoke can broadcast a low-power wake-up signal to all of the connected wireless network devices. The other hazard detectors 1604 can then receive the broadcast wake-up signal and initiate a high-power state for hazard detection and to receive wireless communications of alert messages. Further, the lighting units 1608 can receive the broadcast wake-up signal and activate in the region of the detected hazard to illuminate and identify the problem area. In another example, the lighting units 1608 may activate in one illumination color to indicate a problem area or region in the structure, such as for a detected fire or break-in, and activate in a different illumination color to indicate safe regions and/or escape routes out of the structure.

In various configurations, the wireless network devices 1610 can include an entryway interface device 1616 that functions in coordination with a network-connected door lock system 1618, and that detects and responds to a person's approach to or departure from a location, such as an outer door of the structure 1612. The entryway interface device 1616 can interact with the other wireless network devices based on whether someone has approached or entered the smart-home environment. An entryway interface device 1616 can control doorbell functionality, announce the approach or departure of a person via audio or visual means, and control settings on a security system, such as to activate or deactivate the security system when occupants come and go. The wireless network devices 1610 can also include other sensors and detectors, such as to detect ambient lighting conditions, detect room-occupancy states (e.g., with an occupancy sensor 1620), and control a power and/or dim state of one or more lights. In some instances, the sensors and/or detectors may also control a power state or speed of a fan, such as a ceiling fan 1622. Further, the sensors and/or detectors may detect occupancy in a room or enclosure and control the supply of power to electrical outlets or devices 1624, such as if a room or the structure is unoccupied.

The wireless network devices 1610 may also include connected appliances and/or controlled systems 1626, such as refrigerators, stoves and ovens, washers, dryers, air conditioners, pool heaters 1628, irrigation systems 1630, security systems 1632, and so forth, as well as other electronic and computing devices, such as televisions, entertainment systems, computers, intercom systems, garage-door openers 1634, ceiling fans 1622, control panels 1636, and the like. When plugged in, an appliance, device, or system can announce itself to the home area network as described above and can be automatically integrated with the controls and devices of the home area network, such as in the home. It should be noted that the wireless network devices 1610 may include devices physically located outside of the structure but within wireless communication range, such as a device controlling a swimming pool heater 1628 or an irrigation system 1630.

As described above, the HAN includes a border router 106 that interfaces for communication with an external network, outside the HAN. The border router 106 connects to an access point 110, which connects to the external network 108, such as the Internet. A cloud service 112, which is connected via the external network 108, provides services related to and/or using the devices within the HAN. By way of example, the cloud service 112 can include applications for connecting end-user devices 1638, such as smartphones, tablets, and the like, to devices in the home area network, processing and presenting data acquired in the HAN to end-users, linking devices in one or more HANs 200 to user accounts of the cloud service 112, provisioning and updating devices in the HAN, and so forth. For example, a user can control the thermostat 1602 and other wireless network devices in the home environment using a network-connected computer or portable device, such as a mobile phone or tablet device. Further, the wireless network devices can communicate information to any central server or cloud-computing system via the border router 106 and the access point 110. The data communications can be carried out using any of a variety of custom or standard wireless protocols (e.g., Wi-Fi, ZigBee for low power, 6LoWPAN, Thread, etc.) and/or by using any of a variety of custom or standard wired protocols (CAT6 Ethernet, HomePlug, and so on).

Any of the wireless network devices in the HAN can serve as low-power and communication nodes to create the HAN in the home environment. Individual low-power nodes of the network can regularly send out messages regarding what they are sensing, and the other low-powered nodes in the environment—in addition to sending out their own messages—can repeat the messages, thereby communicating the messages from node to node (e.g., from device to device) throughout the home area network. The wireless network devices can be implemented to conserve power, particularly when battery-powered, utilizing low-powered communication protocols to receive the messages, translate the messages to other communication protocols, and send the translated messages to other nodes and/or to a central server or cloud-computing system. For example, the occupancy sensor 1620 and/or an ambient light sensor 1640 can detect an occupant in a room as well as measure the ambient light, and activate the light source when the ambient light sensor 1640 detects that the room is dark and when the occupancy sensor 1620 detects that someone is in the room. Further, the sensor can include a low-power wireless communication chip (e.g., an IEEE 802.15.4 chip, a Thread chip, a ZigBee chip) that regularly sends out messages regarding the occupancy of the room and the amount of light in the room, including instantaneous messages coincident with the occupancy sensor detecting the presence of a person in the room. As mentioned above, these messages may be sent wirelessly, using the home area network, from node to node (e.g., network-connected device to network-connected device) within the home environment as well as over the Internet to a central server or cloud-computing system.

In other configurations, various ones of the wireless network devices can function as "tripwires" for an alarm system in the home environment. For example, in the event a perpetrator circumvents detection by alarm sensors located at windows, doors, and other entry points of the structure or environment, the alarm could still be triggered by receiving an occupancy, motion, heat, sound, etc. message from one or more of the low-powered mesh nodes in the home area network. In other implementations, the home area network can be used to automatically turn on and off the lighting units 1608 as a person transitions from room to room in the structure. For example, the wireless network devices can detect the person's movement through the structure and communicate corresponding messages via the nodes of the home area network. Using the messages that indicate which rooms are occupied, other wireless network devices that receive the messages can activate and/or deactivate accordingly. As referred to above, the home area network can also be utilized to provide exit lighting in the event of an emergency, such as by turning on the appropriate lighting units 1608 that lead to a safe exit. The lighting units 1608 may also be turned on to indicate the direction along an exit route that a person should travel to safely exit the structure.

The various wireless network devices may also be implemented to integrate and communicate with wearable computing devices 1642, such as may be used to identify and locate an occupant of the structure and adjust the temperature, lighting, sound system, and the like accordingly. In other implementations, radio-frequency identification (RFID) sensing (e.g., a person having an RFID bracelet, necklace, or key fob), synthetic vision techniques (e.g., video cameras and face recognition processors), audio techniques (e.g., voice, sound pattern, vibration pattern recognition), ultrasound sensing/imaging techniques, and infrared or near-field communication (NFC) techniques (e.g., a person wearing an infrared or NFC-capable smartphone), along with rules-based inference engines or artificial intelligence techniques may draw useful conclusions from the sensed information as to the location of an occupant in the structure or environment.

In other implementations, personal comfort-area networks, personal health-area networks, personal safety-area networks, and/or other such human-facing functionalities of service robots can be enhanced by logical integration with other wireless network devices and sensors in the environment according to rules-based inferencing techniques or artificial intelligence techniques for achieving better performance of these functionalities. In an example relating to a personal health area, the system can detect whether a household pet is moving toward the current location of an occupant (e.g., using any of the wireless network devices and sensors), along with rules-based inferencing and artificial intelligence techniques. Similarly, a hazard detector service robot can be notified that the temperature and humidity levels are rising in a kitchen, and temporarily raise a hazard detection threshold, such as a smoke detection threshold, under an inference that any small increases in ambient smoke levels will most likely be due to cooking activity and not due to a genuinely hazardous condition. Any service robot that is configured for any type of monitoring, detecting, and/or servicing can be implemented as a mesh node device on the home area network, conforming to the wireless interconnection protocols for communicating on the home area network.

The wireless network devices 1610 may also include a network-connected alarm clock 1644 for each of the individual occupants of the structure in the home environment. For example, an occupant can customize and set an alarm device for a wake time, such as for the next day or week. Artificial intelligence can be used to consider occupant responses to the alarms when they go off and make inferences about preferred sleep patterns over time. An individual occupant can then be tracked in the home area network based on a unique signature of the person, which is determined based on data obtained from sensors located in the wireless network devices, such as sensors that include ultrasonic sensors, passive IR sensors, and the like. The unique signature of an occupant can be based on a combination of patterns of movement, voice, height, size, etc., as well as using facial or audio recognition techniques.

In an example of wireless interconnection, the wake time for an individual can be associated with the thermostat 1602 to control the HVAC system in an efficient manner so as to pre-heat or cool the structure to desired sleeping and awake temperature settings. The preferred settings can be learned over time, such as by capturing the temperatures set in the thermostat before the person goes to sleep and upon waking up. Collected data may also include biometric indications of a person, such as breathing patterns, heart rate, movement, etc., from which inferences are made based on this data in combination with data that indicates when the person actually wakes up. Other wireless network devices can use the data to provide other automation objectives, such as adjusting the thermostat 1602 so as to pre-heat or cool the environment to a desired setting and turning on or turning off the lighting units 1608.

In implementations, the wireless network devices can also be utilized for sound, vibration, and/or motion sensing such as to detect running water and determine inferences about water usage in a home environment based on algorithms and mapping of the water usage and consumption. This can be used to determine a signature or fingerprint of each water source in the home and is also referred to as "audio fingerprinting water usage." Similarly, the wireless network devices can be utilized to detect the subtle sound, vibration, and/or motion of unwanted pests, such as mice and other rodents, as well as termites, cockroaches, and other insects. The system can then notify an occupant of the suspected pests in the environment, such as with warning messages to help facilitate early detection and prevention.

The environment 1600 may include one or more wireless network devices that function as a hub 1646. The hub 1646 (e.g., hub 120) may be a general-purpose home automation hub, or an application-specific hub, such as a security hub, an energy management hub, an HVAC hub, and so forth. The functionality of a hub 1646 may also be integrated into any wireless network device, such as a network-connected thermostat device or the border router 106. Hosting functionality on the hub 1646 in the structure 1612 can improve reliability when the user's internet connection is unreliable, can reduce latency of operations that would normally have to connect to the cloud service 112, and can satisfy system and regulatory constraints around local access between wireless network devices.

Additionally, the example environment 1600 includes a network-connected-speaker 1648. The network-connected speaker 1648 provides voice assistant services that include providing voice control of network-connected devices. The functions of the hub 1646 may be hosted in the network-connected speaker 1648. The network-connected speaker 1648 can be configured to communicate via the HAN, which may include a wireless mesh network, a Wi-Fi network, or both.

Figure 17:
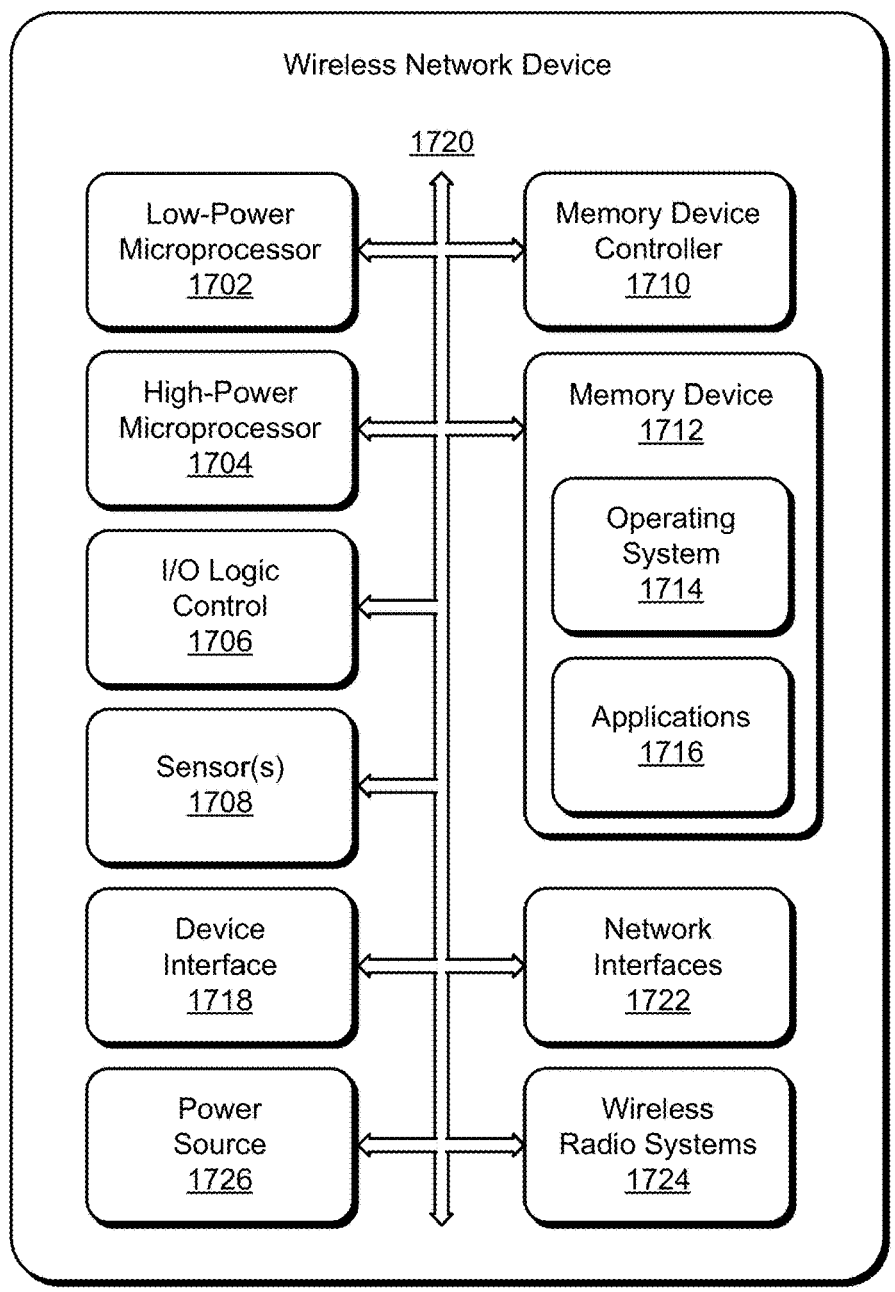
FIG. 17 illustrates an example wireless network device that can be implemented as any of the wireless network devices in a home area network in accordance with one or more aspects of a blind battery connector as described herein.

FIG. 17 illustrates an example wireless network device 1700 that can be implemented as any of the wireless network devices 102 (e.g., electronic device 202 or other target device) in a home area network in accordance with one or more aspects of a blind battery connector as described herein. The device 1700 can be integrated with electronic circuitry, microprocessors, memory, input/output (I/O) logic control, communication interfaces and components, as well as other hardware, firmware, and/or software to implement the device in a home area network. Further, the wireless network device 1700 can be implemented with various components, such as with any number and combination of different components as further described with reference to the example device shown in FIG. 17.

In this example, the wireless network device 1700 includes a low-power microprocessor 1702 and a high-power microprocessor 1704 (e.g., microcontrollers or digital signal processors) that process executable instructions. The device also includes an input-output (I/O) logic control 1706 (e.g., to include electronic circuitry). The microprocessors can include components of an integrated circuit, programmable logic device, a logic device formed using one or more semiconductors, and other implementations in silicon and/or hardware, such as a processor and memory system implemented as a system-on-chip (SoC). Alternatively or in addition, the device can be implemented with any one or combination of software, hardware, firmware, or fixed logic circuitry that may be implemented with processing and control circuits. The low-power microprocessor 1702 and the high-power microprocessor 1704 can also support one or more different device functionalities of the device. For example, the high-power microprocessor 1704 may execute computationally intensive operations, whereas the low-power microprocessor 1702 may manage less-complex processes such as detecting a hazard or temperature from one or more sensors 1708. The low-power microprocessor 1702 may also wake or initialize the high-power microprocessor 1704 for computationally intensive processes.

The one or more sensors 1708 can be implemented to detect various properties such as acceleration, temperature, humidity, water, supplied power, proximity, external motion, device motion, sound signals, ultrasound signals, light signals, fire, smoke, carbon monoxide, global-positioning-satellite (GPS) signals, radio frequency (RF), other electromagnetic signals or fields, or the like. As such, the sensors 1708 may include any one or a combination of temperature sensors, humidity sensors, hazard-related sensors, other environmental sensors, accelerometers, microphones, optical sensors up to and including cameras (e.g., charged coupled-device or video cameras, active or passive radiation sensors, GPS receivers, and radio frequency identification detectors. In implementations, the wireless network device 1700 may include one or more primary sensors, as well as one or more secondary sensors, such as primary sensors that sense data central to the core operation of the device (e.g., sensing a temperature in a thermostat or sensing smoke in a smoke detector), while the secondary sensors may sense other types of data (e.g., motion, light or sound), which can be used for energy-efficiency objectives or automation objectives.

The wireless network device 1700 includes a memory device controller 1710 and a memory device 1712, such as any type of a nonvolatile memory and/or other suitable electronic data storage device. The wireless network device 1700 can also include various firmware and/or software, such as an operating system 1714 that is maintained as computer-executable instructions by the memory and executed by a microprocessor. The device software may also include one or more applications 1716 (e.g., applications 212) that implement various functionalities of the wireless network device 1700. The wireless network device 1700 also includes a device interface 1718 to interface with another device or peripheral component and includes an integrated data bus 1720 that couples the various components of the wireless network device for data communication between the components. The data bus in the wireless network device may also be implemented as any one or a combination of different bus structures and/or bus architectures.

The device interface 1718 may receive input from a user and/or provide information to the user (e.g., as a user interface), and a received input can be used to determine a setting. The device interface 1718 may also include mechanical or virtual components that respond to a user input. For example, the user can mechanically move a sliding or rotatable component, or the motion along a touchpad may be detected, and such motions may correspond to a setting adjustment of the device. Physical and virtual movable user-interface components can allow the user to set a setting along a portion of an apparent continuum. The device interface 1718 may also receive inputs from any number of peripherals, such as buttons, a keypad, a switch, a microphone, and an imager (e.g., a camera device).

The wireless network device 1700 can include network interfaces 1722 (e.g., network interface 218), such as a home area network interface for communication with other wireless network devices in a home area network, and an external network interface for network communication, such as via the Internet. The wireless network device 1700 also includes wireless radio systems 1724 for wireless communication with other wireless network devices via the home area network interface and for multiple, different wireless communications systems. The wireless radio systems 1724 may include Wi-Fi, Bluetooth™, Mobile Broadband, BLE, and/or point-to-point IEEE 802.15.4. Each of the different radio systems can include a radio device, antenna, and chipset that is implemented for a particular wireless communications technology. The wireless network device 1700 also includes a power source 1726, such as a battery (e.g., battery 204) and/or a cable to connect the device to line voltage. An AC power source may also be used to charge the battery of the device.

Figure 18:
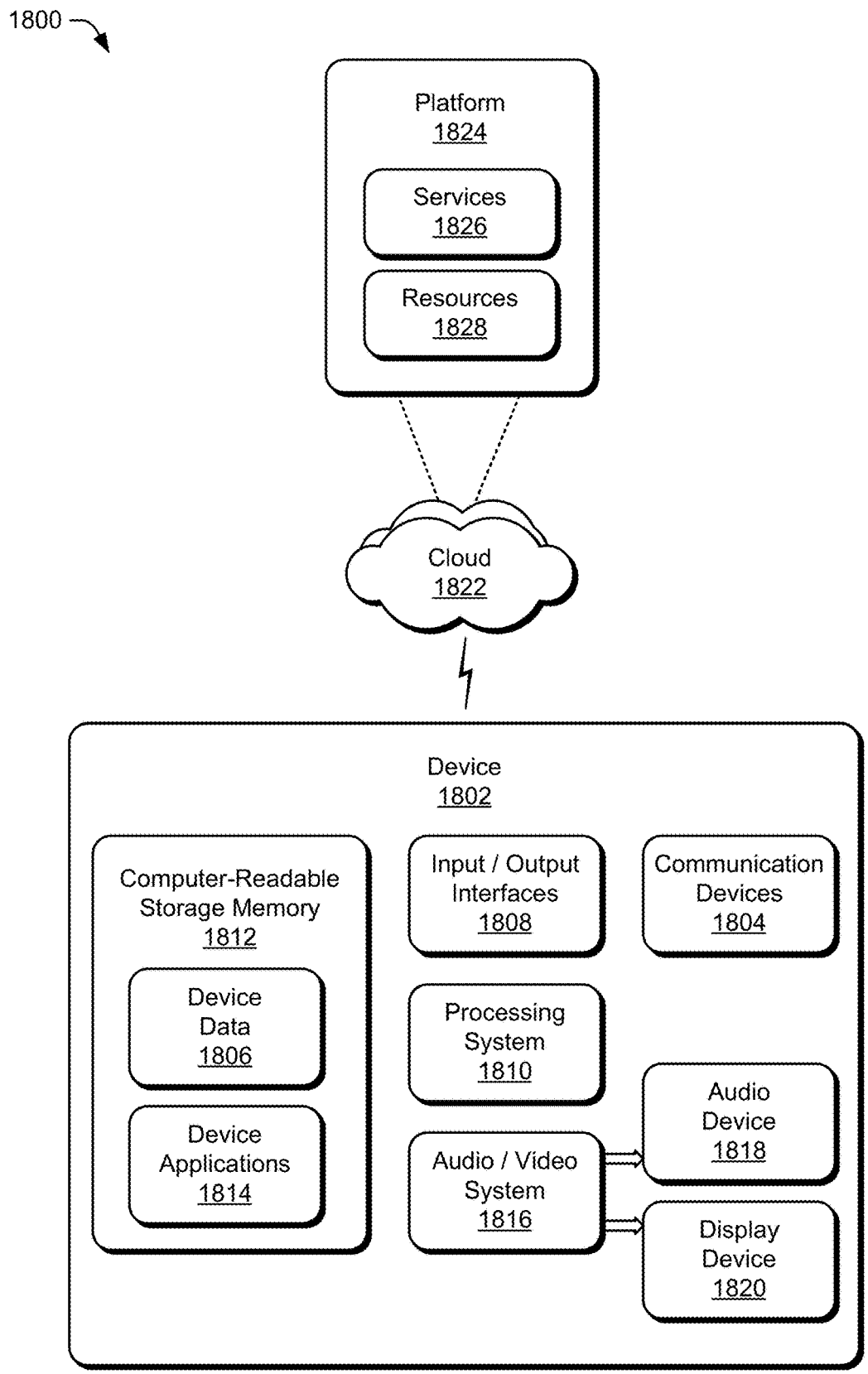
FIG. 18 illustrates an example system that includes an example device, which can be implemented as any of the wireless network devices that implement aspects of a blind battery connector as described with reference to the previous FIGS. 1 to 17.

FIG. 18 illustrates an example system 1800 that includes an example device 1802, which can be implemented as any of the wireless network devices 102 (e.g., electronic device 202 or other target device) that implement aspects of a blind battery connector as described with reference to the previous FIGS. 1 to 17. The example device 1802 may be any type of computing device, client device, mobile phone, tablet, communication, entertainment, gaming, media playback, and/or other type of device. Further, the example device 1802 may be implemented as any other type of wireless network device that is configured for communication on a home area network, such as a thermostat, hazard detector, camera, lighting unit, commissioning device, router, border router, joiner router, joining device, end device, leader, access point, and/or other wireless network devices.

The device 1802 includes communication devices 1804 that enable wired and/or wireless communication of device data 1806, such as data that is communicated between the devices in a home area network, data that is being received, data scheduled for broadcast, data packets of the data, data that is synched between the devices, etc. The device data can include any type of communication data, as well as audio, video, and/or image data that is generated by applications executing on the device. The communication devices 1804 can also include transceivers for cellular phone communication and/or for network data communication.

The device 1802 also includes input/output (I/O) interfaces 1808, such as data network interfaces (e.g., network interface 218) that provide connection and/or communication links between the device, data networks (e.g., a home area network, external network, etc.), and other devices. The I/O interfaces can be used to couple the device to any type of components, peripherals, and/or accessory devices. The PO interfaces also include data input ports via which any type of data, media content, and/or inputs can be received, such as user inputs to the device, as well as any type of communication data, as well as audio, video, and/or image data received from any content and/or data source.

The device 1802 includes a processing system 1810 (e.g., processors 208) that may be implemented at least partially in hardware, such as with any type of microprocessors, controllers, and the like that process executable instructions. The processing system can include components of an integrated circuit, programmable logic device, a logic device formed using one or more semiconductors, and other implementations in silicon and/or hardware, such as a processor and memory system implemented as a system-on-chip (SoC). Alternatively or in addition, the device can be implemented with any one or combination of software, hardware, firmware, or fixed logic circuitry that may be implemented with processing and control circuits. The device 1802 may further include any type of a system bus or other data and command transfer system that couples the various components within the device. A system bus can include any one or combination of different bus structures and architectures, as well as control and data lines.

The device 1802 also includes computer-readable storage memory 1812 (e.g., CRM 210), such as data storage devices that can be accessed by a computing device, and that provide persistent storage of data and executable instructions (e.g., software applications, modules, programs, functions, and the like). The computer-readable storage memory described herein excludes propagating signals. Examples of computer-readable storage memory include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, EPROM, EEPROM, and other types of storage memory in various memory device configurations.

The computer-readable storage memory 1812 provides storage of the device data 1806 and various device applications 1814 (e.g., applications 212), such as an operating system (e.g., operating system 214) that is maintained as a software application with the computer-readable storage memory and executed by the processing system 1810. The device applications 1814 may also include a device manager, such as any form of a control application, software application, signal processing and control module, code that is native to a particular device, a hardware abstraction layer for a particular device, and so on.

The device 1802 also includes an audio and/or video system 1816 that generates audio data for an audio device 1818 and/or generates display data for a display device 1820 (e.g., display 222). The audio device and/or the display device include any devices that process, display, and/or otherwise render audio, video, display, and/or image data, such as the image content of a digital photo. In implementations, the audio device and/or the display device are integrated components of the example device 1802. Alternatively, the audio device and/or the display device are external, peripheral components to the example device. In aspects, at least part of the techniques described for a blind battery connector may be implemented in a distributed system, such as over a "cloud" 1822 in a platform 1824. The cloud 1822 includes and/or is representative of the platform 1824 for services 1826 and/or resources 1828.

The platform 1824 abstracts underlying functionality of hardware, such as server devices (e.g., included in the services 1826) and/or software resources (e.g., included as the resources 1828), and connects the example device 1802 with other devices, servers, etc. The resources 1828 may also include applications and/or data that can be utilized while computer processing is executed on servers that are remote from the example device 1802. Additionally, the services 1826 and/or the resources 1828 may facilitate subscriber network services, such as over the Internet, a cellular network, or Wi-Fi network. The platform 1824 may also serve to abstract and scale resources to service a demand for the resources 1828 that are implemented via the platform, such as in an interconnected device aspect with functionality distributed throughout the system 1800. For example, the functionality may be implemented in part at the example device 1802 as well as via the platform 1824 that abstracts the functionality of the cloud 1822.

Some examples are described below:

An apparatus for engaging a blind battery connection for placing or replacing a battery, the apparatus comprising: an enclosure including a receptacle for receiving a battery pack; circuit board positioned within the enclosure; a system-side connector disposed within the enclosure and attached to the circuit board, the system-side connector: configured to be electrically coupled to a battery connector of the battery pack; including a first polarity-oriented magnet connector corresponding to a second polarity-oriented magnet connector of the battery connector; and configured to use polarity to define an orientation and alignment of the system-side connector relative to the battery connector when in proximity to the battery connector based on a magnetic attraction force.

The first polarity-oriented magnet connector may be embedded within the system-side connector.

The first polarity-oriented magnet connector may include at least one of magnetic chunks with housing or mixed magnet particles within plastic.

The first polarity-oriented magnet connector may include a frame at least partially surrounding a mating surface of the system-side connector.

The frame may have a first portion disposed on a first side of the system-side connector that is lateral to a mating direction of the system-side connector.

The first polarity-oriented magnet connector may have geometric asymmetry around the mating surface of the system-side connector.

The first polarity-oriented magnet connector may have geometric symmetry around at least the mating surface of the system-side connector.

The first polarity-oriented magnet connector may include permanent magnets.

The first polarity-oriented magnet connector may include temporary magnets.

The second polarity-oriented magnet connector may be configured to: be powered by the battery pack; and generate a magnetic field that induces polarity to generate temporary magnetism in the first magnet connector on the system-side connector of the electronic device when the first magnet connector is exposed to the magnetic field.

An electronic device comprising: a circuit board; a system-side connector disposed on the circuit board; a battery pack; and an apparatus for engaging a blind battery connection between the battery pack and the system-side connector according to any one of the previous examples.

The electronic device may further comprise a magnet scaffolding fixture, wherein the magnet scaffolding fixture includes a first portion that: has the first polarity-oriented magnet connector; and is configured to be removably positioned at least partially around the mating surface of the system-side connector.

The magnet scaffolding fixture may include a second portion that: has the second magnet connector; is configured to be removably positioned at least partially around a contact surface of the battery connector; and is configured to magnetically couple to the first portion of the scaffolding fixture effective to cause a physical coupling between the system-side connector and the battery connector.

The scaffolding fixture may be a U-type fixture, an O-type fixture, or a notch-type fixture.

The scaffolding fixture may include a hinged connection between two sections of the first polarity-oriented magnet connector.

CONCLUSION

Unless context dictates otherwise, use herein of the word "or" may be considered use of an "inclusive or," or a term that permits inclusion or application of one or more items that are linked by the word "or" (e.g., a phrase "A or B" may be interpreted as permitting just "A," as permitting just "B," or as permitting both "A" and "B"). Also, as used herein, a phrase referring to "at least one of" a list of items refers to any combination of those items, including single members. For instance, "at least one of a, b, or c" can cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c, or any other ordering of a, b, and c). Further, items represented in the accompanying figures and terms discussed herein may be indicative of one or more items or terms, and thus reference may be made interchangeably to single or plural forms of the items and terms in this written description.

Although aspects of a blind battery connector have been described in language specific to features and/or methods, the subject of the appended claims is not necessarily limited to the specific features or methods described. Rather, the specific features and methods are disclosed as example implementations of the techniques for a blind battery connector, and other equivalent features and methods are intended to be within the scope of the appended claims.

Further, various different aspects are described, and it is to be appreciated that each described aspect can be implemented independently or in connection with one or more other described aspects.

What is claimed is:

1. An electronic device comprising:
   an enclosure including a receptacle for receiving a battery pack;
   a circuit board positioned within the enclosure;
   a system-side connector disposed within the enclosure and attached to the circuit board, the system-side connector:
      configured to be electrically coupled to a battery connector of the battery pack within the receptacle of the enclosure;
      including a first polarity-oriented magnet connector corresponding to a second polarity-oriented magnet connector of the battery connector;
      configured to use polarity to define an orientation and alignment of the system-side connector relative to the battery connector when in proximity to the battery connector based on a magnetic attraction force; and
      configured to use the polarity to repel the battery connector via a magnetic repulsion force when: in proximity to the battery connector; and in an incorrect orientation relative to the battery connector.

2. The electronic device of claim 1, wherein the first polarity-oriented magnet connector is embedded within the system-side connector.

3. The electronic device of claim 1, wherein the first polarity-oriented magnet connector includes at least one of magnetic chunks within a housing or mixed magnet particles within plastic.

4. The electronic device of claim 1, wherein the first polarity-oriented magnet connector includes a frame at least partially surrounding a mating surface of the system-side connector.

5. The electronic device of claim 4, wherein the frame has a first portion disposed on a first side of the system-side connector that is lateral to a mating direction of the system-side connector.

6. The electronic device of claim 4, wherein the first polarity-oriented magnet connector has geometric asymmetry around the mating surface of the system-side connector.

7. The electronic device of claim 4, wherein the first polarity-oriented magnet connector has geometric symmetry around at least the mating surface of the system-side connector.

8. The electronic device of claim 1, wherein the first polarity-oriented magnet connector includes permanent magnets.

9. The electronic device of claim 1 wherein the first polarity-oriented magnet connector includes temporary magnets.

10. The electronic device of claim 1, further comprising the battery pack including the battery connector configured to electrically couple with the system-side connector.

11. The electronic device of claim 10, wherein the second polarity-oriented magnet connector is configured to:
    be powered by the battery pack; and
    generate a magnetic field that induces polarity to generate temporary magnetism in the first magnet connector on the system-side connector of the electronic device when the first magnet connector is exposed to the magnetic field.

12. The electronic device of claim 10, further comprising a magnet scaffolding fixture, wherein the magnet scaffolding fixture includes a first portion that:
  has the first polarity-oriented magnet connector; and
  is configured to be removably positioned at least partially around a mating surface of the system-side connector.

13. The electronic device of claim 12, wherein the magnet scaffolding fixture includes a second portion that:
  has the second polarity-oriented magnet connector;
  is configured to be removably positioned at least partially around a contact surface of the battery connector; and
  is configured to magnetically couple to the first portion of the scaffolding fixture effective to cause a physical coupling between the system-side connector and the battery connector.

14. The electronic device of claim 12, wherein the scaffolding fixture is a U-type fixture, an O-type fixture, or a notch-type fixture.

15. The electronic device of claim 12, wherein the scaffolding fixture includes a hinged connection between two sections of the first polarity-oriented magnet connector.

16. A system comprising:
  an enclosure including a receptacle for receiving a battery pack;
  a circuit board positioned within the enclosure;
  a system-side connector disposed within the enclosure and attached to the circuit board;
  a battery pack including a battery connector configured to be electrically coupled to the system-side connector within the enclosure; and
  a magnet scaffolding fixture, the magnet scaffolding fixture having a first portion that:
    is configured to be removably positioned at least partially around a mating surface of the system-side connector;
    includes a first polarity-oriented magnet connector corresponding to a second polarity-oriented magnet connector associated with the battery connector; and
    is configured to use polarity to define an orientation and alignment of the system-side connector relative to the battery connector when in proximity to the battery connector based on a magnetic attraction force.

17. The system of claim 16, wherein the magnet scaffolding fixture includes a second portion having the second polarity-oriented magnet connector, wherein the second portion is configured to:
  be removably positioned at least partially around a contact surface of the battery connector; and
  magnetically couple to the first portion of the scaffolding fixture effective to cause a physical coupling between the system-side connector and the battery connector.

18. The system of claim 17, wherein the second polarity-oriented magnet connector is configured to:
  be powered by the battery pack; and
  generate a magnetic field that induces polarity to generate temporary magnetism in the first polarity-oriented magnet connector on the system-side connector of the electronic device when the first magnet connector is exposed to the magnetic field.

19. The system of claim 16, wherein the scaffolding fixture is a U-type fixture, an O-type fixture, or a notch-type fixture.

20. The system of claim 16, wherein the scaffolding fixture includes a hinged connection between two sections of the first polarity-oriented magnet connector.

* * * * *